(12) United States Patent
Chen et al.

(10) Patent No.: US 11,956,444 B2
(45) Date of Patent: Apr. 9, 2024

(54) INTER PREDICTION METHOD AND APPARATUS, AND CORRESPONDING ENCODER AND DECODER

(71) Applicant: Huawei Technologies Co., Ltd., Guangdong (CN)

(72) Inventors: Xu Chen, Shenzhen (CN); Jianhua Zheng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 339 days.

(21) Appl. No.: 17/360,786

(22) Filed: Jun. 28, 2021

(65) Prior Publication Data
US 2021/0329251 A1    Oct. 21, 2021

Related U.S. Application Data

(63) Continuation of application No. PCT/CN2019/128136, filed on Dec. 25, 2019.

(30) Foreign Application Priority Data

Dec. 29, 2018    (CN) .................. 201811645808.X

(51) Int. Cl.
*H04N 19/137*    (2014.01)
*H04N 19/105*    (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
CPC .... H04N 19/176; H04N 19/52; H04N 19/517; H04N 19/105; H04N 19/70;
(Continued)

(56) References Cited

U.S. PATENT DOCUMENTS

| 2013/0322543 A1 | 12/2013 | Sugio et al. |
| 2016/0381384 A1 | 12/2016 | Sugio et al. |

(Continued)

FOREIGN PATENT DOCUMENTS

| CN | 103561263 A | 2/2014 |
| CN | 104365101 A | 2/2015 |

(Continued)

OTHER PUBLICATIONS

Tomonori Hashimoto et al., CE4: Enhanced Merge with MVD (Test 4.4.4), JVET-M0060, Dec. 28, 2018.

(Continued)

*Primary Examiner* — Nathnael Aynalem
(74) *Attorney, Agent, or Firm* — WOMBLE BOND DICKINSON (US) LLP

(57) ABSTRACT

An inter prediction method and apparatus, and a corresponding encoder and decoder are disclosed. The method includes: obtaining an index value of a length of a motion vector difference of the current picture block; determining target length information from a set of candidate length information based on the index value of the length; obtaining the motion vector difference of the current picture block based on the target length information; determining the motion vector target value of the current picture block based on the motion vector difference of the current picture block and the motion vector predictor of the current picture block; and obtaining a prediction block of the current picture block based on the motion vector target value of the current picture block.

18 Claims, 15 Drawing Sheets

(51) Int. Cl.
*H04N 19/159* (2014.01)
*H04N 19/176* (2014.01)

(58) Field of Classification Search
CPC .... H04N 19/159; H04N 19/46; H04N 19/139;
H04N 19/137; H04N 19/523; H04N
19/103; H04N 19/44; H04N 19/513;
H04N 19/109; H04N 19/186; H04N
19/184; H04N 19/119; H04N 19/463;
H04N 19/56; H04N 19/51; H04N 19/00;
H04N 19/172; H04N 19/13; H04N
19/174; H04N 19/573; H04N 19/91;
H04N 19/59; H04N 19/593
USPC ........................................ 375/240.01–240.29
See application file for complete search history.

(56) References Cited

U.S. PATENT DOCUMENTS

| | | | | |
|---|---|---|---|---|
| 2019/0238883 | A1* | 8/2019 | Chen | H04N 19/139 |
| 2019/0394483 | A1* | 12/2019 | Zhou | H04N 19/43 |
| 2020/0351505 | A1* | 11/2020 | Seo | H04N 19/105 |
| 2021/0006824 | A1* | 1/2021 | Jeong | H04N 19/176 |
| 2021/0160533 | A1* | 5/2021 | Zhang | H04N 19/109 |
| 2021/0274205 | A1* | 9/2021 | Park | H04N 19/132 |

FOREIGN PATENT DOCUMENTS

| | | |
|---|---|---|
| CN | 104519363 A | 4/2015 |
| CN | 104602023 A | 5/2015 |
| CN | 104717513 A | 6/2015 |
| CN | 107257483 A | 10/2017 |
| JP | 2016187134 A | 10/2016 |
| WO | 2017039117 A1 | 3/2017 |

OTHER PUBLICATIONS

Anish Tamse et al., [CE4.3.5—Adaptive Motion Vector Resolution in JVET-J0024], JVET-K0116-v1, Jul. 2, 2018.

Document: JVET-K0067-v1, Sergey Ikonin et al., CE9: Motion vector difference signs derivation (Test 4.2), Joint Video Experts Team (JVET) of ITU-T SG 16 WP 3 and ISO/IEC JTC 1/SC 29/WG 11, 11th Meeting: Ljubljana, SI, Jul. 10-18, 2018, total 3 pages.

IEEE Std 802.3TM-2018, (Revision of IEEE Std 802.3-2015), IEEE Standard for Ethernet, LAN/MAN Standards Committee of the IEEE Computer Society, Approved Jun. 14, 2018, total 5600 pages.

Document: JVET-L0300, Seethal Paluri et al., CE4-related: Generic Vector Coding of Motion Vector Difference, Joint Video Experts Team (JVET) of ITU-T SG 16 WP 3 and ISO/IEC JTC 1/SC 29/WG 11, 12th Meeting: Macao, CN, Oct. 3-12, 2018, total 5 pages.

IEEE Std 802.1QTM-2018, (Revision of IEEE Std 802.1Q-2014), IEEE Standard for Local and Metropolitan Area Networks—Bridges and Bridged Networks, Sponsor LAN/MAN Standards Committee of the IEEE Computer Society, Approved May 7, 2018, total 1993 pages.

IEEE Std 802.1QbvTM-2015, (Amendment to IEEE Std 802.1Q-2014 as amended by IEEE Std 802.1Qca-2015, IEEE Std 802.1Qcd-2015, and IEEE Std 802.1Q-2014/Cor 1-2015), IEEE Standard for Local and metropolitan area networks—Bridges and Bridged Networks Amendment 25: Enhancements for Scheduled Traffic Sponsor LAN/MAN Standards Committee of the IEEE Computer Society, Approved Dec. 5, 2015, total 57 pages.

ITU-T H.265(Feb. 2018), Series H: Audiovisual and Multimedia Systems Infrastructure of audiovisual services—Coding of moving video, High efficiency video coding, total 692 pages.

JVET-K0115-v4, Seungsoo Jeong et al., CE4 Ultimate motion vector expression in J0024 (Test 4.2.9), Joint Video Experts Team (JVET) of ITU-T SG 16 WP 3 and ISO/IEC JTC 1/SC 29/WG 11, 11th Meeting: Ljubljana, SI, 10 Jul. 18, 2018, 7 pages.

JVET-L1002-v1, Jianle Chen et al., Algorithm description for Versatile Video Coding and Test Model 3 (VTM 3), Joint Video Experts Team (JVET) of ITU-T SG 16 WP 3 and ISO/IEC JTC 1/SC 29/WG 1112th Meeting: Macao, CN, 3 Oct. 12, 2018, 37 pages.

Lin Qi et al., Fast Inter Prediction Algorithm for AVS2, 10.16280/j.videoe.2014.17.017, Sep. 2, 2014, with an English abstract total 5 pages.

* cited by examiner

INTER PREDICTION METHOD AND APPARATUS, AND CORRESPONDING ENCODER AND DECODER

CROSS-REFERENCE TO RELATED APPLICATIONS

This application is a continuation of International Application No. PCT/CN2019/128136, filed on Dec. 25, 2019, which claims priority to Chinese Patent Application No. 201811645808.X, filed on Dec. 29, 2018, the disclosures of which are incorporated herein by reference in their entireties.

TECHNICAL FIELD

The present application relates to the field of video coding technologies, and in particular, to an inter prediction method and apparatus, and a corresponding encoder and decoder.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards including MPEG-2, MPEG-4, ITU-T H.263, and ITU-T H.264/MPEG-4 part 10 advanced video coding (AVC), the video coding standard H.265/high efficiency video coding (HEVC) standard, and extensions of these standards. The video apparatuses can transmit, receive, encode, decode, and/or store digital video information more efficiently by implementing the video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. A picture may be referred to as a frame, and a reference picture may be referred to as a reference frame.

SUMMARY

Embodiments of this application provide an inter prediction method and apparatus, and a corresponding encoder and decoder, to reduce redundancy in a coding process to some degree, and improve coding efficiency.

According to a first aspect, an embodiment of this application provides an inter prediction method. The method includes: obtaining a motion vector predictor of a current picture block; obtaining an index value of a length of a motion vector difference of the current picture block, where the motion vector difference of the current picture block is used to indicate a difference between the motion vector predictor and a motion vector target value of the current picture block; determining target length information from a set of candidate length information based on the index value of the length, where the set of candidate length information includes candidate length information of only N motion vector differences, and N is a positive integer greater than 1 and less than 8; obtaining the motion vector difference of the current picture block based on the target length information; determining the motion vector target value of the current picture block based on the motion vector difference of the current picture block and the motion vector predictor of the current picture block; and obtaining a prediction block of the current picture block based on the motion vector target value of the current picture block.

The set of candidate length information may be preset.

In an embodiment, the method further includes: obtaining an index value of a direction of the motion vector difference of the current picture block; and determining target direction information from candidate direction information of M motion vector differences based on the index value of the direction, where M is a positive integer greater than 1; and
the obtaining the motion vector difference of the current picture block based on the target length information includes: determining the motion vector difference of the current picture block based on the target direction information and the target length information.

In an embodiment, N is 4.

In an embodiment,
the candidate length information of the N motion vector differences includes at least one of the following: when the index value of the length is a first preset value, a length indicated by the target length information is one quarter of a pixel length; when the index value of the length is a second preset value, a length indicated by the target length information is a half of a pixel length; when the index value of the length is a third preset value, a length indicated by the target length information is one pixel length; or when the index value of the length is a fourth preset value, a length indicated by the target length information is two pixel lengths. In an embodiment, the obtaining a motion vector predictor of a current picture block includes: constructing a candidate motion information list of the current picture block, where the candidate motion information list includes L motion vectors, and L is 1, 3, 4, or 5; obtaining an index value of prediction information of motion information of the current picture block in the candidate motion information list, where the prediction information of motion information of the current picture block includes the motion vector predictor; and obtaining the motion vector predictor based on the index value of the motion information of the current picture block in the candidate motion information list and the candidate motion information list.

According to a second aspect, an embodiment of this application provides an inter prediction method. The method includes: obtaining a motion vector predictor of a current picture block; performing motion search in a region of a location indicated by the motion vector predictor of the current picture block, to obtain a motion vector target value of the current picture block; and obtaining an index value of a length of a motion vector difference of the current picture block based on the motion vector target value of the current picture block and the motion vector predictor of the current picture block, where the motion vector difference of the current picture block is used to indicate a difference between the motion vector predictor and the motion vector target value of the current picture block, the index value of the length of the motion vector difference of the current picture block is used to indicate one piece of candidate length information in a set of preset candidate length information, the set of candidate length information includes candidate length information of only N motion vector differences, and N is a positive integer greater than 1 and less than 8.

In an embodiment, the obtaining an index value of a length of a motion vector difference of the current picture block based on the motion vector target value of the current picture block and the motion vector predictor of the current picture block includes: obtaining the motion vector difference of the current picture block based on the motion vector target value of the current picture block and the motion vector predictor of the current picture block; and determining the index value of the length of the motion vector difference of the current picture block and an index value of a direction of the motion vector difference of the current picture block based on the motion vector difference of the current picture block.

In an embodiment, N is 4.

According to a third aspect, an embodiment of this application provides an inter prediction method. The method includes: obtaining a motion vector predictor of a current picture block; obtaining an index value of a direction of a motion vector difference of the current picture block, where the motion vector difference of the current picture block is used to indicate a difference between the motion vector predictor and a motion vector target value of the current picture block; determining target direction information from a set of candidate direction information based on the index value of the direction, where the set of candidate direction information includes candidate direction information of M motion vector differences, and M is a positive integer greater than 4; obtaining the motion vector difference of the current picture block based on the target direction information; determining the motion vector target value of the current picture block based on the motion vector difference of the current block and the motion vector predictor of the current picture block; and obtaining a prediction block of the current picture block based on the motion vector target value of the current picture block.

In an embodiment, the method further includes: obtaining an index value of a length of the motion vector difference of the current picture block; and determining target length information from candidate length information of N motion vector differences based on the index value of the length, where N is a positive integer greater than 1; and
the obtaining the motion vector difference of the current picture block based on the target direction information includes: determining the motion vector difference of the current picture block based on the target direction information and the target length information.

In an embodiment, M is 8.

In an embodiment, the candidate direction information of the M motion vector differences includes at least one of the following:
when the index value of the direction is a first preset value, a direction indicated by the target direction information is exactly right;
when the index value of the direction is a second preset value, a direction indicated by the target direction information is exactly left;
when the index value of the direction is a third preset value, a direction indicated by the target direction information is exactly down;
when the index value of the direction is a fourth preset value, a direction indicated by the target direction information is exactly up;
when the index value of the direction is a fifth preset value, a direction indicated by the target direction information is lower right;
when the index value of the direction is a sixth preset value, a direction indicated by the target direction information is upper right;
when the index value of the direction is a seventh preset value, a direction indicated by the target direction information is lower left; or
when the index value of the direction is an eighth preset value, a direction indicated by the target direction information is upper left.

In an embodiment, the obtaining a motion vector predictor of a current picture block includes: constructing a candidate motion information list of the current picture block, where the candidate motion information list includes L motion vectors, and L is 1, 3, 4, or 5; obtaining an index value of prediction information of motion information of the current picture block in the candidate motion information list, where the prediction information of motion information of the current picture block includes the motion vector predictor; and obtaining the motion vector predictor based on the index value of the motion information of the current picture block in the candidate motion information list and the candidate motion information list.

According to a fourth aspect, an embodiment of this application provides an inter prediction method. The method includes: obtaining a motion vector predictor of a current picture block; performing motion search in a region of a location indicated by the motion vector predictor of the current picture block, to obtain a motion vector target value of the current picture block; and obtaining an index value of a direction of a motion vector difference of the current picture block based on the motion vector target value of the current picture block and the motion vector predictor of the current picture block, where the motion vector difference of the current picture block is used to indicate a difference between the motion vector predictor and the motion vector target value of the current picture block, the index value of the direction of the motion vector difference of the current picture block is used to indicate one piece of candidate direction information in a set of preset candidate direction information, the set of candidate length information includes candidate direction information of M motion vector differences, and M is a positive integer greater than 4.

In an embodiment, the obtaining an index value of a direction of a motion vector difference of the current picture block based on the motion vector target value of the current picture block and the motion vector predictor of the current picture block includes: obtaining the motion vector difference of the current picture block based on the motion vector target value of the current picture block and the motion vector predictor of the current picture block; and determining the index value of the length of the motion vector difference of the current picture block and the index value of the direction of the motion vector difference of the current picture block based on the motion vector difference of the current picture block.

In an embodiment, M is 8.

According to a fifth aspect, an embodiment of this application provides an inter prediction method. The method includes: obtaining a first motion vector predictor of a current picture block and a second motion vector predictor of the current picture block, where the first motion vector predictor corresponds to a first reference frame, and the second motion vector predictor corresponds to a second reference frame; obtaining a first motion vector difference of the current picture block, where the first motion vector difference of the current picture block is used to indicate a difference between the first motion vector predictor and a first motion vector target value of the current picture block, and the first motion vector target value and the first motion vector predictor correspond to a same reference frame; determining a second motion vector difference of the current picture block based on the first motion vector difference, where the second motion vector difference of the current picture block is used to indicate a difference between the second motion vector predictor and a second motion vector target value of the current picture block, the second motion vector target value and the second motion vector predictor correspond to a same reference frame, and when a direction of the first reference frame relative to a current frame in which the current picture block is located is the same as a direction of the second reference frame relative to the current frame, the second motion vector difference is the first motion vector difference, or when the direction of the first reference frame relative to the current frame in which the current picture block is located is opposite to the direction of the second reference frame relative to the current frame, a plus or minus sign of the second motion vector difference is opposite to a plus or minus sign of the first motion vector difference, and an absolute value of the second motion vector difference is the same as an absolute value of the first motion vector difference; determining the first motion vector target value of the current picture block based on the first motion vector difference and the first motion vector predictor; determining the second motion vector target value of the current picture block based on the second motion vector difference and the second motion vector predictor; and obtaining a prediction block of the current picture block based on the first motion vector target value and the second motion vector target value.

According to a sixth aspect, an embodiment of this application provides an inter prediction apparatus, and the apparatus includes:
  a prediction unit, configured to obtain a motion vector predictor of a current picture block; and
  an obtaining unit, configured to configured to obtain an index value of a length of a motion vector difference of the current picture block, where the motion vector difference of the current picture block is used to indicate a difference between the motion vector predictor and a motion vector target value of the current picture block, where
  the prediction unit is further configured to: determine target length information from a set of candidate length information based on the index value of the length, where the set of candidate length information includes candidate length information of only N motion vector differences, and N is a positive integer greater than 1 and less than 8; obtain the motion vector difference of the current picture block based on the target length information; determine the motion vector target value of the current picture block based on the motion vector difference of the current picture block and the motion vector predictor of the current picture block; and obtain a prediction block of the current picture block based on the motion vector target value of the current picture block.

In an embodiment, the obtaining unit is further configured to obtain an index value of a direction of the motion vector difference of the current picture block;
  the prediction unit is further configured to determine target direction information from candidate direction information of M motion vector differences based on the index value of the direction, where M is a positive integer greater than 1; and
  the prediction unit is configured to determine the motion vector difference of the current picture block based on the target direction information and the target length information.

In an embodiment, N is 4.

In an embodiment,
  the candidate length information of the N motion vector differences includes at least one of the following: when the index value of the length is a first preset value, a length indicated by the target length information is one quarter of a pixel length; when the index value of the length is a second preset value, a length indicated by the target length information is a half of a pixel length; when the index value of the length is a third preset value, a length indicated by the target length information is one pixel length; or when the index value of the length is a fourth preset value, a length indicated by the target length information is two pixel lengths.

In an embodiment, the prediction unit is configured to: construct a candidate motion information list of the current picture block, where the candidate motion information list may include L motion vectors, and L is 1, 3, 4, or 5; obtain an index value of prediction information of motion information of the current picture block in the candidate motion information list, where the prediction information of motion information of the current picture block includes the motion vector predictor; and obtain the motion vector predictor based on the index value of the motion information of the current picture block in the candidate motion information list and the candidate motion information list.

According to a seventh aspect, an embodiment of this application provides an inter prediction apparatus, and the apparatus includes:
  an obtaining unit, configured to obtain a motion vector predictor of a current picture block; and
  a prediction unit, configured to perform motion search in a region of a location indicated by the motion vector predictor of the current picture block, to obtain a motion vector target value of the current picture block, where
  the prediction unit is further configured to obtain an index value of a length of a motion vector difference of the current picture block based on the motion vector target value of the current picture block and the motion vector predictor of the current picture block, where the motion vector difference of the current picture block is used to indicate a difference between the motion vector predictor and the motion vector target value of the current picture block, the index value of the length of the motion vector difference of the current picture block is used to indicate one piece of candidate length information in a set of preset candidate length information, the set of candidate length information includes candidate length information of only N motion vector differences, and N is a positive integer greater than 1 and less than 8.

In an embodiment, the prediction unit is configured to: obtain the motion vector difference of the current picture block based on the motion vector target value of the current picture block and the motion vector predictor of the current picture block; and determine the index value of the length of the motion vector difference of the current picture block and an index value of a direction of the motion vector difference of the current picture block based on the motion vector difference of the current picture block.

In an embodiment, N is 4.

According to an eighth aspect, an embodiment of this application provides an inter prediction apparatus, and the apparatus includes:

a prediction unit, configured to obtain a motion vector predictor of a current picture block; and
   an obtaining unit, configured to configured to obtain an index value of a direction of a motion vector difference of the current picture block, where the motion vector difference of the current picture block is used to indicate a difference between the motion vector predictor and a motion vector target value of the current picture block, where
   the prediction unit is further configured to: determine target direction information from a set of candidate direction information based on the index value of the direction, where the set of candidate direction information includes candidate direction information of M motion vector differences, and M is a positive integer greater than 4; obtain the motion vector difference of the current picture block based on the target direction information; determine the motion vector target value of the current picture block based on the motion vector difference of the current picture block and the motion vector predictor of the current picture block; and obtain a prediction block of the current picture block based on the motion vector target value of the current picture block.

In an embodiment, the obtaining unit is further configured to obtain an index value of a length of the motion vector difference of the current picture block;

the prediction unit is further configured to determine target length information from candidate length information of N motion vector differences based on the index value of the length, where N is a positive integer greater than 1; and
   the prediction unit is configured to determine the motion vector difference of the current picture block based on the target direction information and the target length information.

In an embodiment, M is 8.

In an embodiment,
the candidate direction information of the M motion vector differences may include at least one of the following:
   when the index value of the direction is a first preset value, a direction indicated by the target direction information is exactly right;
   when the index value of the direction is a second preset value, a direction indicated by the target direction information is exactly left;
   when the index value of the direction is a third preset value, a direction indicated by the target direction information is exactly down;
   when the index value of the direction is a fourth preset value, a direction indicated by the target direction information is exactly up;
   when the index value of the direction is a fifth preset value, a direction indicated by the target direction information is lower right;
   when the index value of the direction is a sixth preset value, a direction indicated by the target direction information is upper right;
   when the index value of the direction is a seventh preset value, a direction indicated by the target direction information is lower left; or
   when the index value of the direction is an eighth preset value, a direction indicated by the target direction information is upper left.

In an embodiment, the prediction unit is configured to: construct a candidate motion information list of the current picture block, where the candidate motion information list includes L motion vectors, and L is 1, 3, 4, or 5; obtain an index value of prediction information of motion information of the current picture block in the candidate motion information list, where the prediction information of motion information of the current picture block includes the motion vector predictor; and obtain the motion vector predictor based on the index value of the motion information of the current picture block in the candidate motion information list and the candidate motion information list.

According to a ninth aspect, an embodiment of this application provides an inter prediction apparatus, and the apparatus includes:

an obtaining unit, configured to obtain a motion vector predictor of a current picture block; and
   a prediction unit, configured to perform motion search in a region of a location indicated by the motion vector predictor of the current picture block, to obtain a motion vector target value of the current picture block, where
   the prediction unit is further configured to obtain an index value of a direction of a motion vector difference of the current picture block based on the motion vector target value of the current picture block and the motion vector predictor of the current picture block, where the motion vector difference of the current picture block is used to indicate a difference between the motion vector predictor and the motion vector target value of the current picture block, the index value of the direction of the motion vector difference of the current picture block is used to indicate one piece of candidate direction information in a set of preset candidate direction information, the set of candidate direction information includes candidate length information of M motion vector differences, and M is a positive integer greater than 4.

In an embodiment, the prediction unit is configured to: obtain the motion vector difference of the current picture block based on the motion vector target value of the current picture block and the motion vector predictor of the current picture block; and determine an index value of a length of the motion vector difference of the current picture block and the index value of the direction of the motion vector difference of the current picture block based on the motion vector difference of the current picture block.

In an embodiment, M is 8.

According to a tenth aspect, an embodiment of this application provides an inter prediction apparatus, and the apparatus includes:

an obtaining unit, obtain a first motion vector predictor of a current picture block and a second motion vector predictor of the current picture block, where the first motion vector predictor corresponds to a first reference frame, and the second motion vector predictor corresponds to a second reference frame, where the obtaining unit is further configured to obtain a first motion vector difference of the current picture block, where the first motion vector difference of the current picture block is used to indicate a difference between the first motion vector predictor and a first motion vector target value of the current picture block, and the first motion vector target value and the first motion vector predictor correspond to a same reference frame; and a prediction unit, configured to: determine a second motion vector difference of the current picture block based on the first motion vector difference, where the second motion vector difference of the current picture block is used to indicate a difference between the second motion vector predictor and a second motion vector target value of the current picture block, the second motion vector target value and the second motion vector predictor correspond to a same reference frame, and when a direction of the first reference frame relative to a current frame in which the current picture block is located is the same as a direction of the second reference frame relative to the current frame, the second motion vector difference is the first motion vector difference, or when the direction of the first reference frame relative to the current frame in which the current picture block is located is opposite to the direction of the second reference frame relative to the current frame, a plus or minus sign of the second motion vector difference is opposite to a plus or minus sign of the first motion vector difference, and an absolute value of the second motion vector difference is the same as an absolute value of the first motion vector difference; determine the first motion vector target value of the current picture block based on the first motion vector difference and the first motion vector predictor; determine the second motion vector target value of the current picture block based on the second motion vector difference and the second motion vector predictor; and obtain a prediction block of the current picture block based on the first motion vector target value and the second motion vector target value.

According to an eleventh aspect, an embodiment of this application provides a video decoder. The video decoder is configured to decode a bitstream to obtain a picture block, and includes:

the inter prediction apparatus according to any one of the first aspect or the embodiments of the first aspect, where the inter prediction apparatus is configured to obtain a prediction block of the current picture block; and a reconstruction module, configured to reconstruct the current picture block based on the prediction block.

According to a twelfth aspect, an embodiment of this application provides a video encoder. The video encoder is configured to encode a picture block, and includes:

the inter prediction apparatus according to any one of the second aspect or the embodiments of the second aspect, where the inter prediction apparatus is configured to obtain an index value of a length of a motion vector difference of a current picture block based on a motion vector predictor of the current picture block, where the index value of the length of the motion vector difference of the current picture block is used to indicate one piece of candidate length information in a set of preset candidate length information; and an entropy encoding module, configured to encode the index value of the length of the motion vector difference of the current picture block into a bitstream.

According to a thirteenth aspect, an embodiment of this application provides a video decoder. The video decoder is configured to decode a bitstream to obtain a picture block, and includes:

the inter prediction apparatus according to any one of the third aspect or the embodiments of the third aspect, where the inter prediction apparatus is configured to obtain a prediction block of the current picture block; and a reconstruction module, configured to reconstruct the current picture block based on the prediction block.

According to a fourteenth aspect, an embodiment of this application provides a video encoder. The video encoder is configured to encode a picture block, and includes:

the inter prediction apparatus according to any one of the fourth aspect or the embodiments of the fourth aspect, where the inter prediction apparatus is configured to obtain an index value of a direction of a motion vector difference of a current picture block based on a motion vector predictor of the current picture block, where the index value of the direction of the motion vector difference of the current picture block is used to indicate one piece of candidate direction information in a set of preset candidate direction information; and an entropy encoding module, configured to encode the index value of the direction of the motion vector difference of the current picture block into a bitstream.

According to a fifteenth aspect, an embodiment of this application provides a video data decoding device. The device includes:

a memory, configured to store video data in a form of a bitstream; and the video decoder according to any one of the eleventh aspect, the thirteenth aspect, the fifteenth aspect, or any one of the eleventh aspect, the thirteenth aspect, or the fifteenth aspect.

According to a sixteenth aspect, an embodiment of this application provides a video data encoding device. The device includes:

a memory, configured to store video data, where the video data includes one or more picture blocks; and the video encoder according to any one of the twelfth aspect, the fourteenth aspect, or the embodiments of the twelfth aspect and the fourteenth aspect.

According to a seventeenth aspect, an embodiment of this application provides an encoding device. The encoding device includes a nonvolatile memory and a processor that are coupled to each other, where the processor invokes program code stored in the memory to perform a part of or all of operations in any method according to any one of the second aspect, the fourth aspect, or the embodiments of the second aspect and the fourth aspect.

According to an eighteenth aspect, an embodiment of this application provides a decoding device. The decoding device includes a nonvolatile memory and a processor that are coupled to each other. The processor invokes program code stored in the memory to perform a part of or all of operations in any method according to any one of the first aspect, the third aspect, the fifth aspect, or the embodiments of the first aspect, the third aspect, and the fifth aspect.

According to a nineteenth aspect, an embodiment of this application provides a computer-readable storage medium. The computer-readable storage medium stores program code, and the program code includes instructions used to perform a part of or all of operations in the method according to any one of the first aspect to the fifth aspect, or the embodiments of the first aspect to the fifth aspect.

According to a twentieth aspect, an embodiment of this application provides a computer program product. When the computer program product runs on a computer, the computer is enabled to perform a part of or all of operations in the method according to any one of the first aspect to the fifth aspect or the embodiments of the first aspect to the fifth aspect.

It should be understood that, technical solutions in the second aspect of this application to the tenth aspect of this application are consistent with the technical solution in the first aspect. Beneficial effects achieved by the various aspects and corresponding embodiments are similar, and details are not described again.

BRIEF DESCRIPTION OF DRAWINGS

To describe the technical solutions in the embodiments of the present application more clearly, the following describes the accompanying drawings in the embodiments of the present application or the background.

DETAILED DESCRIPTION

Figure 1A:
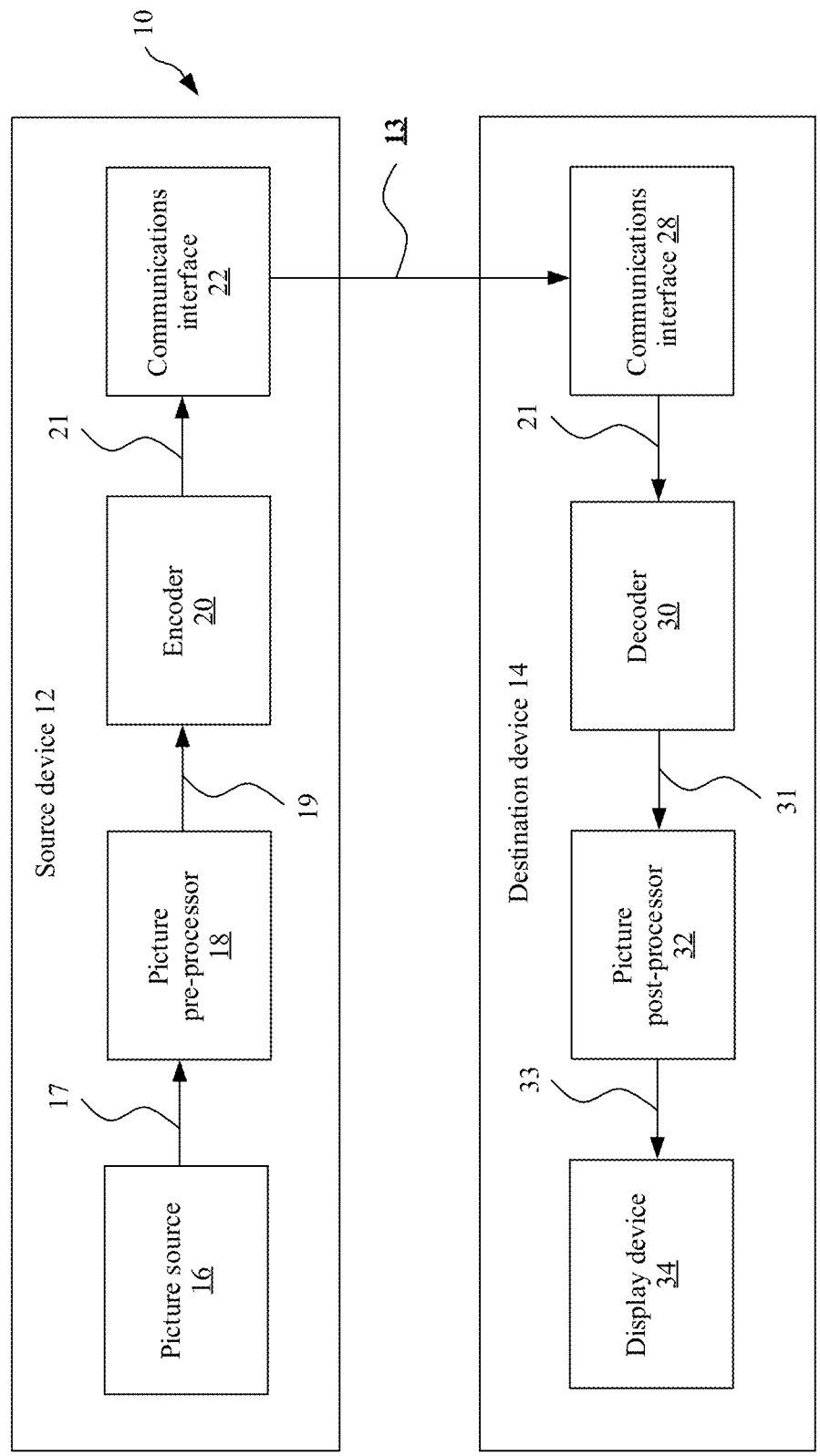
FIG. 1A is a block diagram of an example of a video coding system according to an embodiment.

The following describes the embodiments of the present application with reference to the accompanying drawings in the embodiments of the present application. In the following description, reference is made to the accompanying drawings that form a part of this disclosure and show, by way of illustration, aspects of the embodiments of the present application or aspects in which the embodiments of the present application may be used. It should be understood that the embodiments of the present application may be used in other aspects, and may include structural or logical changes not depicted in the accompanying drawings. Therefore, the following detailed description shall not be understood in a limiting sense, and the scope of the present application is defined by the appended claims. For example, it should be understood that disclosed content with reference to described methods may also hold true for a corresponding device or system configured to perform the method, and vice versa. For example, if one or more method operations are described, a corresponding device may include one or more units such as functional units for performing the described one or more method operations (for example, one unit performs the one or more operations; or a plurality of units, each of which performs one or more of the operations), even if such one or more units are not explicitly described or illustrated in the accompanying drawings. In addition, for example, if an apparatus is described based on one or more units such as a functional unit, a corresponding method may include a step used to perform one or more functionalities of one or more units (for example, one step used to perform one or more functionalities of one or more units; or operations, each of which is used perform one or more functionalities of one or more units in a plurality of units), even if such one or more of operations are not explicitly described or illustrated in the accompanying drawings. Further, it should be understood that features of the various example embodiments and/or aspects described in this specification may be combined with each other, unless otherwise specified.

The technical solutions in the embodiments of the present application may not only be applied to existing video coding standards (for example, standards such as H.264 and HEVC), but also be applied to future video coding standards (for example, the H.266 standard). Terms used in embodiments of the present application are merely intended to explain embodiments of the present application, but are not intended to limit the present application. The following first briefly describes some concepts that may be used in the embodiments of the present application.

Video coding typically refers to processing of a sequence of pictures that constitute a video or a video sequence. In the field of video coding, the terms "picture", "frame", and "image" may be used as synonyms. Video coding used in this specification refers to video encoding or video decoding. Video encoding is performed on a source side, and usually includes processing (for example, by compressing) an original video picture to reduce an amount of data for representing the video picture, for more efficient storage and/or transmission. Video decoding is performed on a destination side, and typically includes inverse processing in comparison with an encoder to reconstruct a video picture. "Coding" of a video picture in the embodiments should be understood as "encoding" or "decoding" of a video sequence. A combination of encoding components and decoding components is also referred to as codec (CODEC).

A video sequence includes a series of pictures, a picture is further split into slices, and a slice is further split into blocks. Video coding is performed by blocks. In some new video coding standards, the concept of a block is further extended. For example, a macroblock (MB) is introduced in the H.264 standard. The macroblock may be further split into a plurality of prediction blocks (partition) that can be used for predictive coding. In the high efficiency video coding (HEVC) standard, basic concepts such as "coding unit" (CU), "prediction unit" (PU), and "transform unit" (TU) are used. Block units are obtained through functional division, and are described by using a new tree-based structure. For example, a CU may be split into smaller CUs through quadtree split, and the smaller CU may further be split, to generate a quadtree structure. The CU is a basic unit for splitting and encoding a coding picture. A PU and a TU also have similar tree structures. The PU may correspond to a prediction block, and is a basic unit for predictive coding. The CU is further partitioned into a plurality of PUs in a partitioning pattern. The TU may correspond to a transform block, and is a basic unit for transforming a prediction residual. However, all of the CU, the PU, and the TU are concepts of blocks (or picture blocks) in essence.

For example, in HEVC, a CTU is partitioned into a plurality of CUs by using a quadtree structure represented as a coding tree. A decision on whether to encode a picture area by using inter-picture (temporal) or intra-picture (spatial) prediction is made at a CU level. Each CU may further be split into one, two, or four PUs based on a PU splitting pattern. In one PU, a same prediction process is applied, and related information is transmitted to a decoder on a PU basis. After obtaining a residual block by applying the prediction process based on the PU splitting pattern, the CU may be partitioned into transform units (TU) based on another quadtree structure similar to the coding tree used for the CU. In latest development of a video compression technology, a CTU is partitioned by using quad-tree plus multi-type tree, to obtain CUs. The multi-type tree includes a binary tree and a ternary tree. In the split structure, the CU may be square or rectangular.

Herein, for ease of description and understanding, a to-be-encoded picture block in a current coded picture may be referred to as a current block. For example, in encoding, the current block is a block that is currently being encoded; and in decoding, the current block is a block that is currently being decoded. A decoded picture block, in a reference picture, used to predict the current block is referred to as a reference block. For example, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sample value, or a sample signal in the prediction block. For example, after reference blocks are traversed, an optimal reference block is found. The optimal reference block provides prediction for the current block, and this block is referred to as a prediction block. The current block may also be referred to as a current picture block.

In a case of lossless video coding, original video pictures can be reconstructed, and this means that reconstructed video pictures have same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed on a decoder side. This means that quality of reconstructed video pictures is lower or poorer than that of the original video pictures.

Several H.261 video coding standards are used for "lossy hybrid video codecs" (namely, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On the decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, subsequent blocks.

The following describes a system architecture to which the embodiments of the present application are applied. FIG. 1A is a schematic block diagram of an example of a video coding system according to an embodiment. As shown in FIG. 1A, video coding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various embodiments, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communications device, and the like.

Although FIG. 1A depicts the source device 12 and the destination device 14 as separate devices, in an embodiment, a device may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A communication connection between the source device 12 and the destination device 14 may be implemented over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communication standard (for example, a wireless communication protocol), and may transmit modulated video data to the destination device 14. The one or more communications media may include a wireless communications medium and/or a wired communications medium, for example, a radio frequency (RF) spectrum or one or more physical transmission lines. The one or more communications media may form a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20, and optionally, the source device 12 may further include a picture source 16, a picture pre-processor 18, and a communications interface 22. In an embodiment, the encoder 20, the picture source 16, the picture pre-processor 18, and the communications interface 22 may be hardware components in the source device 12, or may be a software program in the source device 12. Separate descriptions are as follows.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera for capturing a picture or a memory for storing a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the source device. When the picture source 16 is a memory, the picture source 16 may be, for example, a local memory or a memory integrated into the source device. When the picture source 16 includes an interface, the interface may be, for example, an external interface for receiving a picture from an external video source. The external video source is, for example, an external picture capture device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements. The picture element in the array may also be referred to as a sample. A quantity of samples in horizontal and vertical directions (or axes) of the array or the picture defines a size and/or a resolution of the picture. For representation of a color, typically three color components are employed. For example, the picture may be represented as or include three sample arrays. For example, in an RGB format or a color space, a picture includes corresponding red, green, and blue sample arrays. However, in video coding, each pixel is typically represented in a luminance/chrominance format or a color space. For example, a picture in a YUV format includes a luminance component indicated by Y (sometimes L is used instead) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be converted or transformed into a picture in the YUV format and vice versa, and such a process is also known as color transformation or conversion. If a picture is monochrome, the picture may include only a luma sample array. In this embodiment of the present invention, a picture transmitted by the picture source 16 to a picture processor may also be referred to as original picture data 17.

The picture pre-processor 18 is configured to receive the original picture data 17 and pre-process the original picture data 17, to obtain a pre-processed picture 19 or pre-processed picture data 19. For example, the pre-processing performed by the picture pre-processor 18 may include trimming, color format conversion (for example, from an RGB format to a YUV format), color correction, or denoising.

The encoder 20 (also referred to as a video encoder) is configured to receive the pre-processed picture data 19, and process the pre-processed picture data 19 by using a related prediction mode (such as a prediction mode in each embodiment of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of the inter prediction method described herein.

The communications interface 22 may be configured to receive the encoded picture data 21, and transmit the encoded picture data 21 to the destination device 14 or any other device (for example, a memory) over the link 13 for storage or direct reconstruction. The any other device may be any device used for decoding or storage. The communications interface 22 may be, for example, configured to package the encoded picture data 21 into an appropriate format, for example, a data packet, for transmission over the link 13.

The destination device 14 includes a decoder 30, and in an embodiment, the destination device 14 may further include a communications interface 28, a picture post-processor 32, and a display device 34. Separate descriptions are as follows.

The communications interface 28 may be configured to receive the encoded picture data 21 from the source device 12 or any other source. The any other source is, for example, a storage device, and the storage device is, for example, an encoded picture data storage device. The communications interface 28 may be configured to transmit or receive the encoded picture data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communications interface 28 may be, for example, configured to depackage the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (also referred to as video decoder) is configured to receive the encoded picture data 21 and provide decoded picture data (or decoded picture) 31 (structural details of the decoder 30 are further described below based on FIG. 3, FIG. 4, or FIG. 5). In some embodiments, the decoder 30 may be configured to perform various embodiments described below, to implement decoder-side application of the inter prediction method described herein.

The picture post-processor 32 is configured to post-process the decoded picture data 31 (also referred to as reconstructed picture data), to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, in an embodiment, a device may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

As will be apparent for a person skilled in the art based on the descriptions, existence and (exact) split of functionalities of the different units or functionalities of the source device 12 and/or the destination device 14 shown in FIG. 1A may vary depending on an actual device and application. The source device 12 and the destination device 14 each may be any one of a wide range of devices, including any type of handheld or stationary device, for example, a notebook or laptop computer, a mobile phone, a smartphone, a pad or a tablet computer, a video camera, a desktop computer, a set-top box, a television, a camera, a vehicle-mounted device, a display device, a digital media player, a video game console, a video streaming device (such as a content service server or a content distribution server), a broadcast receiver device, or a broadcast transmitter device, and may not use or may use any type of operating system.

The encoder 20 and the decoder 30 each may be implemented as any one of various appropriate circuits, for example, one or more microprocessors, digital signal processors (DSPs), application-specific integrated circuits (ASICs), field-programmable gate arrays (FPGAs), discrete logic, hardware, or any combinations thereof. If the technologies are implemented partially by using software, a device may store software instructions in an appropriate non-transitory computer-readable storage medium and may execute the instructions by using hardware such as one or more processors, to perform the technologies of this disclosure. Any one of the foregoing content (including hardware, software, a combination of hardware and software, and the like) may be considered as one or more processors.

In some embodiments, the video coding system 10 shown in FIG. 1A is merely an example and the techniques of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode and store data in the memory, and/or a video decoding device may retrieve and decode data from the memory. In some examples, the encoding and the decoding are performed by devices that do not communicate with one another, but simply encode data to the memory and/or retrieve and decode data from the memory.

Figure 1B:
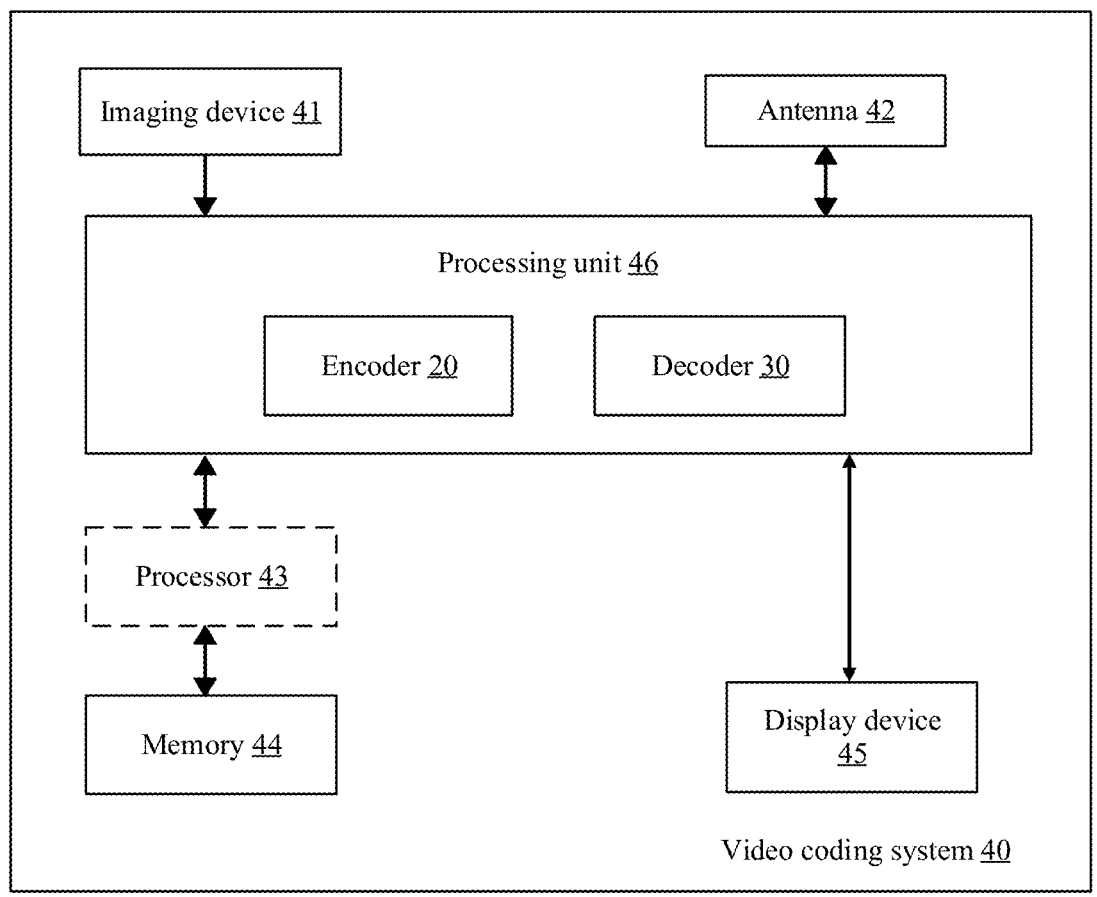
FIG. 1B is a block diagram of another example of a video coding system according to an embodiment.

FIG. 1B is an illustrative diagram of an example of a video coding system according to an embodiment. In FIG. 1B, video coding system 40 includes the encoder 20 in FIG. 2 and/or the decoder 30 in FIG. 3, according to an embodiment. The video coding system 40 can implement a combination of various techniques in the embodiments described herein. In the illustrated embodiment, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some embodiments, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include an application-specific integrated circuit (ASIC) logic, a graphics processor, a general-purpose processor, or the like. The video coding system 40 may also include processor 43 (which may be optional in some embodiments). The processor 43 may similarly include an application-specific integrated circuit (ASIC) logic, a graphics processor, a general-purpose processor, or the like. In some embodiments, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-restrictive example, the memory 44 may be implemented by a cache memory. In some embodiments, the logic circuit 47 may access the memory 44 (for example, for implementing a picture buffer). In other examples, the logic circuit 47 and/or the processing unit 46 may include a memory (for example, a cache) for implementing a picture buffer.

In some embodiments, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some embodiments, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by a processing unit 2820 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some embodiments, the antenna 42 may be configured to receive an encoded bitstream of video data. As described, the encoded bitstream may include data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment, for the example described with reference to the encoder 20, the decoder 30 may be configured to perform an inverse process. With regard to a signaling syntax element, the decoder 30 may be configured to receive and parse such a syntax element and correspondingly decode related video data. In some examples, the encoder 20 may entropy encode the syntax element into an encoded video bitstream. In such embodiments, the decoder 30 may parse such a syntax element and correspondingly decode related video data.

It should be noted that the inter prediction method described in the embodiments of the present invention is mainly used in an inter prediction process, and the process exists in both the encoder 20 and the decoder 30. The encoder 20/the decoder 30 in the embodiments of the present invention may be an encoder/decoder corresponding to a video standard protocol such as H.263, H.264, HEVV, MPEG-2, MPEG-4, VP8, or VP9, or corresponding to a next-generation video standard protocol (such as H.266).

Figure 2:
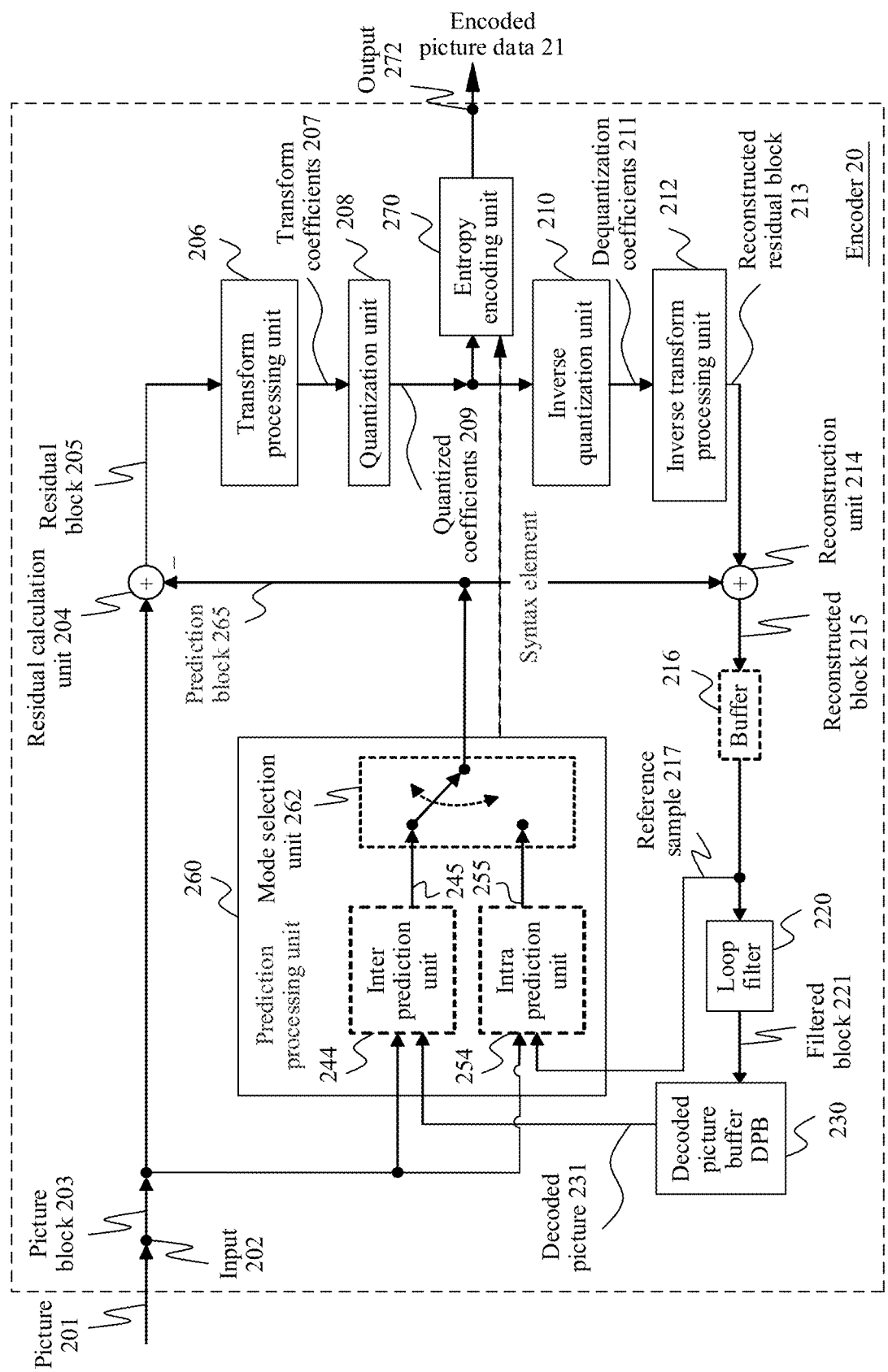
FIG. 2 is a block diagram of an example structure of an encoder according to an embodiment.

FIG. 2 is a schematic/conceptual block diagram of an example encoder according to an embodiment. In the example of FIG. 2, encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not depicted in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the DPB 230, and the prediction processing unit 260 form a reverse signal path of the encoder. The reverse signal path of the encoder corresponds to a signal path of a decoder (refer to the decoder 30 in FIG. 3).

The encoder 20 receives, for example, from an input 202, a picture 201 or a picture block 203 of the picture 201, for example, a picture in a sequence of pictures forming a video or a video sequence. The picture block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

In an embodiment, the encoder 20 may include a partitioning unit (not depicted in FIG. 2), configured to partition the picture 201 into a plurality of blocks such as the picture blocks 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an embodiment, the prediction processing unit 260 of the encoder 20 may be configured to perform any combination of the partitioning techniques described above.

Like the picture 201, the picture block 203 is also or may be considered as a two-dimensional array or matrix of samples with sample values, although of a smaller size than the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines a size of the picture block 203.

The encoder 20 shown in FIG. 2 is configured to encode the picture 201 block by blocks, for example, the encoder encodes and predicts each picture block 203.

The residual calculation unit 204 is configured to calculate a residual block 205 based on the picture block 203 and a prediction block 265 (further details about the prediction block 265 are provided below), for example, obtain the residual block 205 in a sample domain by subtracting sample values of the prediction block 265 from sample values of the picture block 203 sample by sample (pixel by pixel).

The transform processing unit 206 is configured to apply a transform, for example, a discrete cosine transform (DCT) or a discrete sine transform (DST), on sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply an integer approximation of DCT/DST, such as transforms specified in HEVC/H.265. In comparison with an orthogonal DCT transform, such an integer approximation is typically scaled by a factor. To preserve a norm of a residual block which is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. Specific scaling factors are, for example, specified for the inverse transform, for example, by the inverse transform processing unit 212 on the decoder side 30 (and the corresponding inverse transform, for example, by the inverse transform processing unit 212 on the encoder side 20), and corresponding scaling factors for the forward transform, for example, by the transform processing unit 206 on the encoder side 20 may be specified accordingly.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. The quantization process may reduce a bit depth associated with some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (QP). The quantization parameter may be, for example, an index of a predefined set of applicable quantization steps. For example, a smaller quantization parameter may correspond to finer quantization (a smaller quantization step) and a larger quantization parameter may correspond to coarser quantization (a larger quantization step) or vice versa. The quantization may include division by a quantization step and corresponding quantization and/or inverse quantization, for example, performed by the inverse quantization unit 210, or may include multiplication by a quantization step. In some embodiments according to some standards such as HEVC, a quantization parameter may be used to determine the quantization step. Generally, the quantization step may be calculated based on a quantization parameter using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an embodiment, scales of the inverse transform and the dequantization may be combined. Alternatively, a customized quantization table may be used and signaled from the encoder to the decoder, for example, in a bitstream. The quantization is a lossy operation, where loss increases with an increasing quantization step.

The inverse quantization unit 210 is configured to apply inverse quantization of the quantization unit 208 to quantization coefficients to obtain dequantization coefficients 211, for example, apply, based on or by using a same quantization step as the quantization unit 208, inverse of a quantization scheme applied by the quantization unit 208. The dequantization coefficients 211 may also be referred to as dequantized residual coefficients 211 and correspond, although typically not identical to the transform coefficients due to the loss by quantization, to the transform coefficients 207.

The inverse transform processing unit 212 is configured to apply an inverse transform of the transform applied by the transform processing unit 206, for example, an inverse DCT or an inverse DST, to obtain an inverse transform block 213 in the sample domain. The inverse transform block 213 may also be referred to as an inverse transform dequantized block 213 or an inverse transform residual block 213.

The reconstruction unit 214 (for example, a summer) is configured to add the inverse transform block 213 (e.g., a reconstructed residual block) to the prediction block 265 to obtain a reconstructed block 215 in a sample domain, for example, by adding a sample value of the reconstructed residual block 213 and the sample value of the prediction block 265.

In an embodiment, a buffer unit (or buffer) 216 of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value stored in the buffer unit 216 for any type of estimation and/or prediction, for example, intra prediction.

For example, in an embodiment, the encoder 20 may be configured so that the buffer unit 216 is not only used for storing the reconstructed block 215 for the intra prediction unit 254 but also used for the loop filter unit 220 (not depicted in FIG. 2), and/or so that, for example, the buffer unit 216 and the decoded picture buffer unit 230 form one buffer. In other embodiments, a filtered block 221 and/or a block or a sample from the decoded picture buffer 230 (the block or sample is not depicted in FIG. 2) are/is used as an input or a basis for the intra prediction unit 254.

The loop filter unit (or loop filter) 220 is configured to filter the reconstructed block 215 to obtain the filtered block 221, to smooth pixel transition or improve video quality. The loop filter unit 220 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 220 is shown in FIG. 2 as an in-loop filter, in other embodiments, the loop filter unit 220 may be implemented as a post-loop filter. The filtered block 221 may also be referred to as a filtered reconstructed block. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter to decoding.

The DPB 230 may be a reference picture memory that stores reference picture data for use in encoding video data by the encoder 20. The DPB 230 may be formed by any one of a variety of memory devices, such as a dynamic random access memory (DRAM) (including a synchronous DRAM (SDRAM), a magnetoresistive RAM (MRAM), and a resistive RAM (RRAM)), or another type of memory devices. The DPB 230 and the buffer 216 may be provided by a same memory device or separate memory devices. In an example, the DPB 230 is configured to store the filtered block 221. The decoded picture buffer 230 may be further configured to store another previously filtered block, for example, the previously reconstructed and filtered block 221, of a same current picture or of different pictures, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the DPB 230 is configured to store the reconstructed block 215.

The prediction processing unit 260, also referred to as a block prediction processing unit, is configured to receive or obtain the picture block 203 (e.g., a current picture block of the current picture 201) and reconstructed picture data, for example, reference samples of a same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra prediction mode or an inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260). The prediction mode provides an optimal match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate distortion optimization (rate distortion optimization, RDO), that is, select a prediction mode that provides minimum rate distortion optimization or select a prediction mode for which related rate distortion at least satisfies a prediction mode selection criterion.

In the following, prediction processing (for example, performed the prediction processing unit 260) and mode selection (for example, performed the mode selection unit 262) performed by the example encoder 20 are to be explained in detail.

As described above, the encoder 20 is configured to determine or select the optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In an embodiment, a set of inter prediction modes depends on available reference pictures (namely, for example, at least some decoded pictures stored in the DPB 230, as described above) and other inter prediction parameters, for example, depends on whether an entire reference picture or only a part of the reference picture, for example, a search window region around a region of the current block, is used for searching for an optimal matched reference block, and/or for example, depends on whether pixel interpolation such as half-pixel and/or quarter-pixel interpolation is applied. The set of inter prediction modes may include, for example, an advanced motion vector prediction (AMVP) mode and a merge mode. In an embodiment, the set of inter prediction modes may include a refined control point-based AMVP mode and a refined control point-based merge mode in the embodiments of the present invention. In an example, the intra prediction unit 254 may be configured to perform any combination of inter prediction techniques described below.

In addition to the foregoing prediction modes, a skip mode and/or a direct mode may also be applied in the embodiments of the present invention.

The prediction processing unit 260 may be further configured to partition the picture block 203 into smaller block partitions or sub-blocks, for example, by iteratively using quad-tree (QT) partitioning, binary-tree (BT) partitioning, triple-tree (TT) partitioning, or any combination thereof, and to perform, for example, prediction on each of the block partitions or sub-blocks, where mode selection includes selection of a tree structure of the partitioned picture block 203 and selection of a prediction mode applied to each of the block partitions or sub-blocks.

The inter prediction unit 244 may include a motion estimation (ME) unit (not depicted in FIG. 2) and a motion compensation (motion compensation, MC) unit (not depicted in FIG. 2). The motion estimation unit is configured to receive or obtain the picture block 203 (the current picture block of the current picture 201) and the decoded pictures 231, or at least one or more previously reconstructed blocks, for example, reconstructed blocks of one or more other/different previously decoded pictures 231, for motion estimation. For example, a video sequence may include the current picture and a previously decoded picture 31. In other words, the current picture and the previously decoded picture 31 may be a part of a sequence of pictures forming a video sequence or form the sequence of pictures.

For example, a motion estimation unit (not depicted in FIG. 2) may be configured to select a reference block from a plurality of reference blocks of a same picture or different pictures of a plurality of other pictures and provide, for a motion compensation unit (not depicted in FIG. 2), a reference picture and/or provide an offset (a spatial offset) between a motion vector (a location (coordinates X and Y) of the reference block) and a location of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not depicted in FIG. 2) may include extracting or generating a prediction block based on a motion/block vector determined through motion estimation (interpolation may be performed at a sub-sample precision level). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 246 may locate a prediction block to which the motion vector points in one of reference picture lists. The motion compensation unit 246 may further generate a syntax element associated with a block and a video slice, for use by the decoder 30 in decoding a picture block of the video slice.

In an embodiment, the inter prediction unit 244 may transmit a syntax element to the entropy encoding unit 270, where the syntax element includes an inter prediction parameter (for example, indication information of an inter prediction mode that is selected for prediction of a current block after inter prediction modes are traversed, or at least one of an index value of a length of a motion vector difference of the current picture block and an index value of a direction of the motion vector difference of the current picture block). In an embodiment, if there is only one inter prediction mode, the inter prediction parameter may alternatively not be carried in the syntax element. In this case, the decoder side 30 may directly perform decoding in a default prediction mode. It can be understood that the inter prediction unit 244 may be configured to perform any combination of inter prediction techniques.

The intra prediction unit 254 is configured to obtain, for example, receive, a picture block 203 (the current picture block) and one or more previously reconstructed blocks, for example, reconstructed neighboring blocks, of a same picture for intra estimation. The encoder 20 may be, for example, configured to select an intra prediction mode from (predetermined) intra prediction modes.

In an embodiment, the encoder 20 may be configured to select an intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter of the selected intra prediction mode. In any case, after selecting the intra prediction mode for a block, the intra prediction unit 254 is further configured to provide the intra prediction parameter, that is, information indicating the selected intra prediction mode for the block, to the entropy encoding unit 270. In an embodiment, the intra prediction unit 254 may be configured to perform any combination of intra prediction techniques.

In an embodiment, the intra prediction unit 254 may transmit a syntax element to the entropy encoding unit 270, where the syntax element includes an intra prediction parameter (for example, indication information of an intra prediction mode that is selected for prediction for the current block after a plurality of intra prediction modes are traversed). In a possible application scenario, if there is only one intra prediction mode, the intra prediction parameter may alternatively not be carried in the syntax element. In this case, the decoder side 30 may directly perform decoding in a default prediction mode.

The entropy encoding unit 270 is configured to apply (or bypass) an entropy encoding algorithm or a scheme (for example, a variable length coding (VLC) scheme, a context adaptive VLC (CAVLC) scheme, an arithmetic coding scheme, a context adaptive binary arithmetic coding (CABAC), syntax-based context-adaptive binary arithmetic coding (SBAC), probability interval partitioning entropy (PIPE) coding, or another entropy coding methodology or technique) on one or all of the following: the quantization coefficients 209, the inter prediction parameter, the intra prediction parameter, and/or the loop filter parameter, to obtain the encoded picture data 21 which can be output through an output 272, for example, in a form of an encoded bitstream. The encoded bitstream may be transmitted to the video decoder 30, or archived for later transmission or retrieval by the video decoder 30. The entropy encoding unit 270 may be further configured to entropy encode another syntax element for a current video slice being encoded.

Other structural variations of the video encoder 20 may be configured to encode a video stream. For example, a non-transform based encoder 20 may quantize a residual signal directly without the transform processing unit 206 for some blocks or frames. In another embodiment, the encoder 20 includes the quantization unit 208 and the inverse quantization unit 210 that can be combined into a single unit.

In an embodiment, the encoder 20 can be configured to implement an inter prediction method described in the following embodiments.

It should be understood that other structural variations of the video encoder 20 may be configured to encode a video stream. For example, for some picture blocks or picture frames, the video encoder 20 may quantize the residual signal directly without processing by the transform processing unit 206, and correspondingly, without processing by the inverse transform processing unit 212. Alternatively, for some picture blocks or picture frames, the video encoder 20 does not generate residual data, and correspondingly, there is no need for the transform processing unit 206, the quantization unit 208, the inverse quantization unit 210, and the inverse transform processing unit 212 to perform processing. Alternatively, the video encoder 20 may directly store a reconstructed picture block as a reference block, without processing by the filter 220. Alternatively, the quantization unit 208 and the inverse quantization unit 210 in the video encoder 20 may be combined together. The loop filter 220 may be optional in some embodiments. In a case of lossless compression encoding, the transform processing unit 206, the quantization unit 208, the inverse quantization unit 210, and the inverse transform processing unit 212 may be optional in some embodiments. It should be understood that in different application scenarios, the inter prediction unit 244 and the intra prediction unit 254 may be used selectively.

Figure 3:
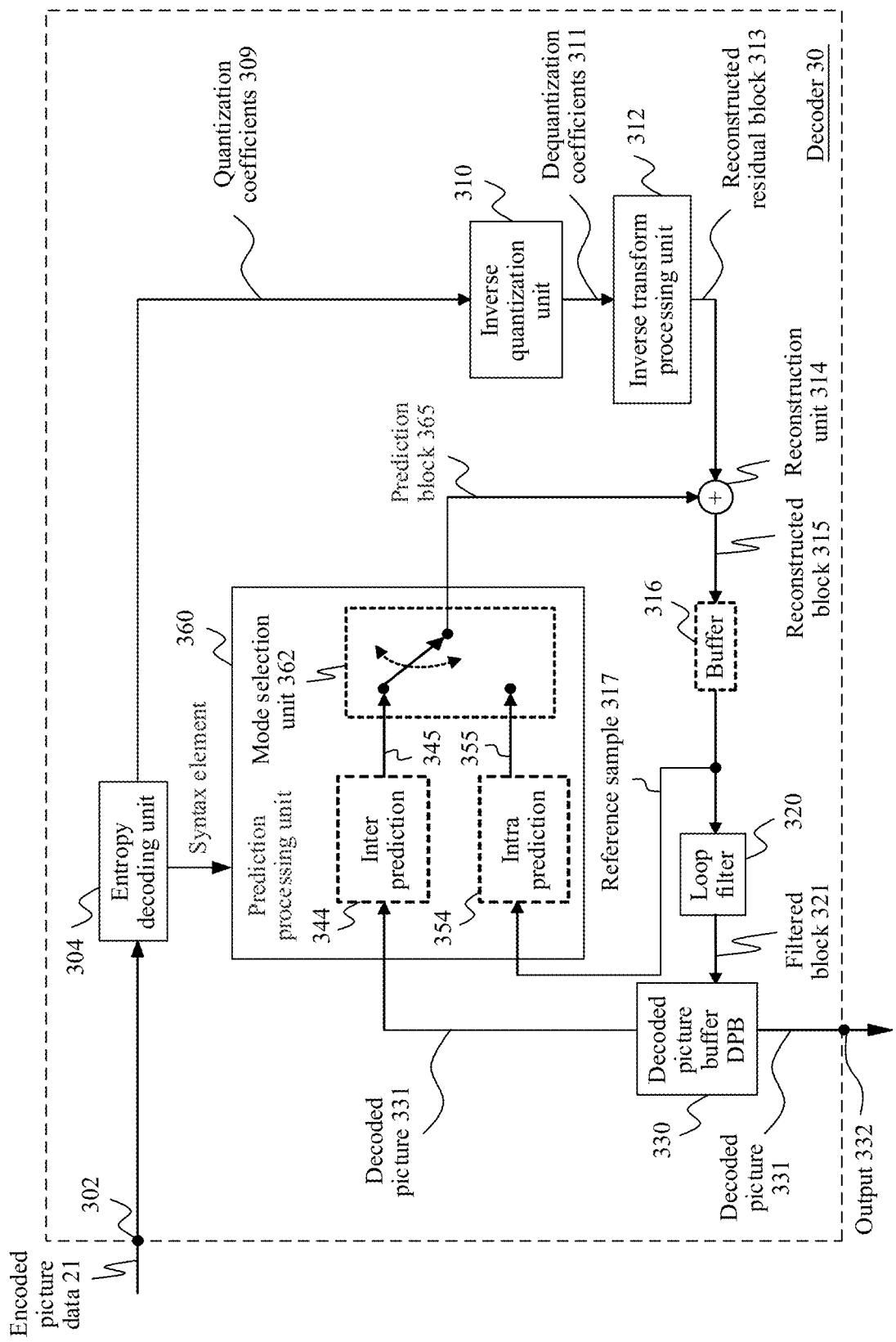
FIG. 3 is a block diagram of an example structure of a decoder according to an embodiment.

FIG. 3 is a schematic/conceptual block diagram of an example decoder according to an embodiment. Decoder 30 (e.g., a video decoder) is configured to receive encoded picture data (for example, an encoded bitstream) 21 encoded by, for example, the encoder 20, to obtain a decoded picture 231. In a decoding process, the decoder 30 receives video data from the video encoder 20, for example, an encoded video bitstream that represents a picture block of an encoded video slice and associated syntax elements.

In the example of FIG. 3, the decoder 30 includes an entropy decoding unit 304, an inverse quantization unit 310, an inverse transform processing unit 312, a reconstruction unit 314 (for example, a summer), a buffer 316, a loop filter 320, a decoded picture buffer 330, and a prediction processing unit 360. The prediction processing unit 360 may include an inter prediction unit 344, an intra prediction unit 354, and a mode selection unit 362. In some embodiments, the video decoder 30 may perform a decoding pass generally reciprocal to the encoding pass described with reference to the encoder 20 in FIG. 2.

The entropy decoding unit 304 is configured to perform entropy decoding on the encoded picture data 21 to obtain, for example, quantization coefficients 309 and/or decoded encoding parameters (not depicted in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in functions, and the intra prediction unit 354 may resemble the intra prediction unit 254 in functions. The prediction processing unit 360 is usually configured to perform block prediction and/or obtain a prediction block 365 from the encoded data 21, and receive or obtain (explicitly or implicitly) a prediction related parameter (for example, at least one of an index value of a length of a motion vector difference of a current picture block and an index value of a direction of the motion vector difference of the current picture block) and/or information about a selected prediction mode, for example, from the entropy decoding unit 304.

When a video slice is coded as an intra coded (I) slice, the intra prediction unit 354 of the prediction processing unit 360 is configured to generate a prediction block 365 for a picture block of the current video slice based on a signaled intra prediction mode and data that is from a previously decoded block of a current frame or picture. When a video frame is coded as an inter coded (B or P) slice, the inter prediction unit 344 (for example, a motion compensation unit) of the prediction processing unit 360 is configured to generate a prediction block 365 for a video block of the current video slice based on a motion vector and another syntax element (for example, the syntax element may be at least one of an index value of a length of a motion vector difference of a current picture block and an index value of a direction of the motion vector difference of the current picture block) received from the entropy decoding unit 304. For inter prediction, the prediction block may be generated from one of reference pictures in one reference picture list. The video decoder 30 may construct reference frame lists: a list 0 and a list 1, by using a default construction technique based on reference pictures stored in the DPB 330.

The prediction processing unit 360 is configured to determine prediction information for the video block of the current video slice by parsing the motion vector and/or the another syntax element, and use the prediction information to generate the prediction block for the current video block being decoded. In an embodiment, the prediction processing unit 360 determines, by using some received syntax elements, a prediction mode (for example, intra prediction or inter prediction) for encoding the video block in the video slice, an inter prediction slice type (for example, a B slice, a P slice, or a GPB slice), construction information of one or more of the reference picture lists for the slice, a motion vector of each inter encoded video block in the slice, an inter prediction status of each inter encoded video block in the slice, and other information, to decode the video block in the current video slice. In another embodiment, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to inverse quantize (namely, dequantize) a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to the transform coefficient to generate a residual block in a pixel domain.

The reconstruction unit 314 (for example, the summer) is configured to add an inverse transform block 313 (namely, a reconstructed residual block 313) to the prediction block 365 to obtain a reconstructed block 315 in a sample domain, for example, by adding a sample value of the reconstructed residual block 313 and a sample value of the prediction block 365.

The loop filter unit 320 (during a coding loop or after a coding loop) is configured to filter the reconstructed block 315 to obtain a filtered block 321, to smooth pixel transition or improve video quality. In an embodiment, the loop filter unit 320 may be configured to perform any combination of filtering techniques described below. The loop filter unit 320 is intended to represent one or more loop filters such as a deblocking filter, a sample-adaptive offset (SAO) filter, or another filter such as a bilateral filter, an adaptive loop filter (ALF), a sharpening or smoothing filter, or a collaborative filter. Although the loop filter unit 320 is shown in FIG. 3 as an in-loop filter, in other configurations, the loop filter unit 320 may be implemented as a post-loop filter.

A decoded video block 321 in a given frame or picture is then stored in the decoded picture buffer 330 that stores a reference picture used for subsequent motion compensation.

The decoder 30 is configured to, for example, output the decoded picture 31 through an output 332, for presentation to a user or viewing by a user.

Other variations of the video decoder 30 may be configured to decode a compressed bitstream. For example, the decoder 30 may generate an output video stream without the loop filter unit 320. For example, a non-transform based decoder 30 may inversely quantize a residual signal directly without the inverse transform processing unit 312 for some blocks or frames. In another embodiment, the video decoder 30 includes the inverse quantization unit 310 and the inverse transform processing unit 312 that can be combined into a single unit.

In an embodiment, the decoder 30 is configured to implement an inter prediction method described in the following embodiments.

It should be understood that other structural variations of the decoder 30 may be configured to decode the encoded video bitstream. For example, the decoder 30 may generate an output video stream without processing performed by the filter 320. Alternatively, for some picture blocks or picture frames, the entropy decoding unit 304 of the video decoder 30 does not obtain quantization coefficients through decoding, and correspondingly, there is no need for the inverse quantization unit 310 and the inverse transform processing unit 312 to perform processing. The loop filter 320 may be optional in some embodiments. In a case of lossless compression, the inverse quantization unit 310 and the inverse transform processing unit 312 may be optional in some embodiments. It should be understood that in different application scenarios, the inter prediction unit and the intra prediction unit may be used selectively.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of the current picture block or a motion vector of a sub-block of the current picture block derived from a motion vector of a neighboring affine coded block may be further processed. This is not limited in this application. For example, a value of a motion vector is restricted to be within a specific bit width range. Assuming that an allowed bit width of a motion vector is bitDepth, a value of the motion vector ranges from $-2^{(bitDepth-1)}$ to $2^{(bitDepth-1)}-1$, where the symbol "^" represents exponentiation. If bitDepth is 16, the value range is from $-32768$ to $32767$. If bitDepth is 18, the value ranges from $-131072$ to $131071$. For another example, values of motion vectors (for example, motion vectors MVs of four 4×4 sub-blocks in an 8×8 picture block) are restricted, so that a maximum difference between integer parts of the MVs of the four 4×4 sub-blocks does not exceed N pixels, for example, does not exceed one pixel.

The following two manners may be used to restrict the motion vector to be within a specific bit width:

Manner 1: An overflow most significant bit of the motion vector is removed:

$$ux=(vx+2^{bitDepth})\%2^{bitDepth}$$

$$vx=(ux>=2^{bitDepth-1})?(ux-2^{bitDepth}):ux$$

$$uy=(vy+2^{bitDepth})\%2^{bitDepth}$$

$$vy=(uy>=2^{bitDepth-1})?(uy-2^{bitDepth}):uy$$

vx represents a horizontal component of the motion vector of the picture block or the sub-block of the picture block. vy represents a vertical component of the motion vector of the picture block or the sub-block of the picture block. ux and uy are intermediate values. bitDepth represents a bit depth.

For example, a value of vx is $-32769$, and 32767 is derived according to the foregoing formulas. A value is stored in a computer in a two's complement representation, a two's complement representation of $-32769$ is 1,0111,1111,1111,1111 (17 bits), and processing performed by the computer for overflowing is discarding a most significant bit. Therefore, a value of vx is 0111,1111,1111,1111, that is, 32767. This value is consistent with the result derived through processing according to the formulas.

Manner 2: Clipping is performed on the motion vector, as shown in the following formulas:

$$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

vx represents a horizontal component of the motion vector of the picture block or the sub-block of the picture block. vy represents a vertical component of the motion vector of the picture block or the sub-block of the picture block. x, y, and z correspond to three input values of an MV clamping process clip3. Clip3 is defined to indicate clipping a value of z to a range [x, y].

$$\text{Clip3}(x, y, z) = \begin{cases} x & ; \quad z < x \\ y & ; \quad z > y \\ z & ; \quad \text{otherwise} \end{cases}$$

Figure 4:
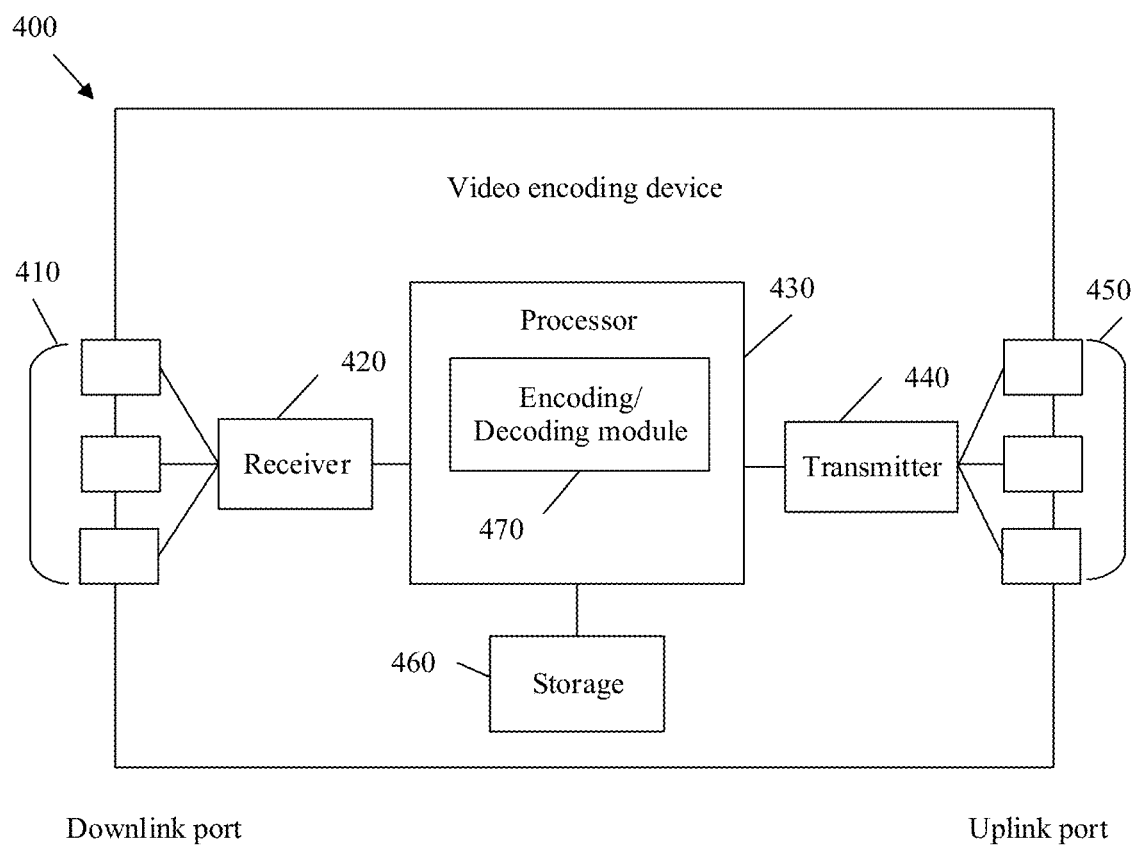
FIG. 4 is a block diagram of an example of a video coding device according to an embodiment.

FIG. 4 is a schematic structural diagram of a video coding device according to an embodiment. In FIG. 4, video coding device 400 may be a video encoding device or a video decoding device. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiver unit (Rx) 420 that are configured to receive data; a processor, a logic unit, or a central processing unit (CPU) 430 that is configured to process data; a transmitter unit (Tx) 440 and egress ports 450 that are configured to transmit data; and a memory 460 configured to store data. The video coding device 400 may further include an optical-to-electrical component and an electrical-to-optical (EO) component that are coupled to the ingress ports 410, the receiver unit 420, the transmitter unit 440, and the egress ports 450, for egress or ingress of optical or electrical signals.

The processor 430 is implemented by using hardware and software. The processor 430 may be implemented as one or more CPU chips, cores (for example, multi-core processors), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement the inter prediction method provided in the embodiments of the present invention. For example, the encoding/decoding module 470 implements, processes, or provides various coding operations. Therefore, inclusion of the encoding/decoding module 470 provides a substantial improvement to functions of the video coding device 400 and affects a transform of the video coding device 400 to a different state. Alternatively, the encoding/decoding module 470 is implemented as instructions stored in the memory 460 and executed by the processor 430.

The memory 460 includes one or more disks, tape drives, and solid state drives and may be used as an overflow data storage device, to store programs when such programs are selectively executed, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
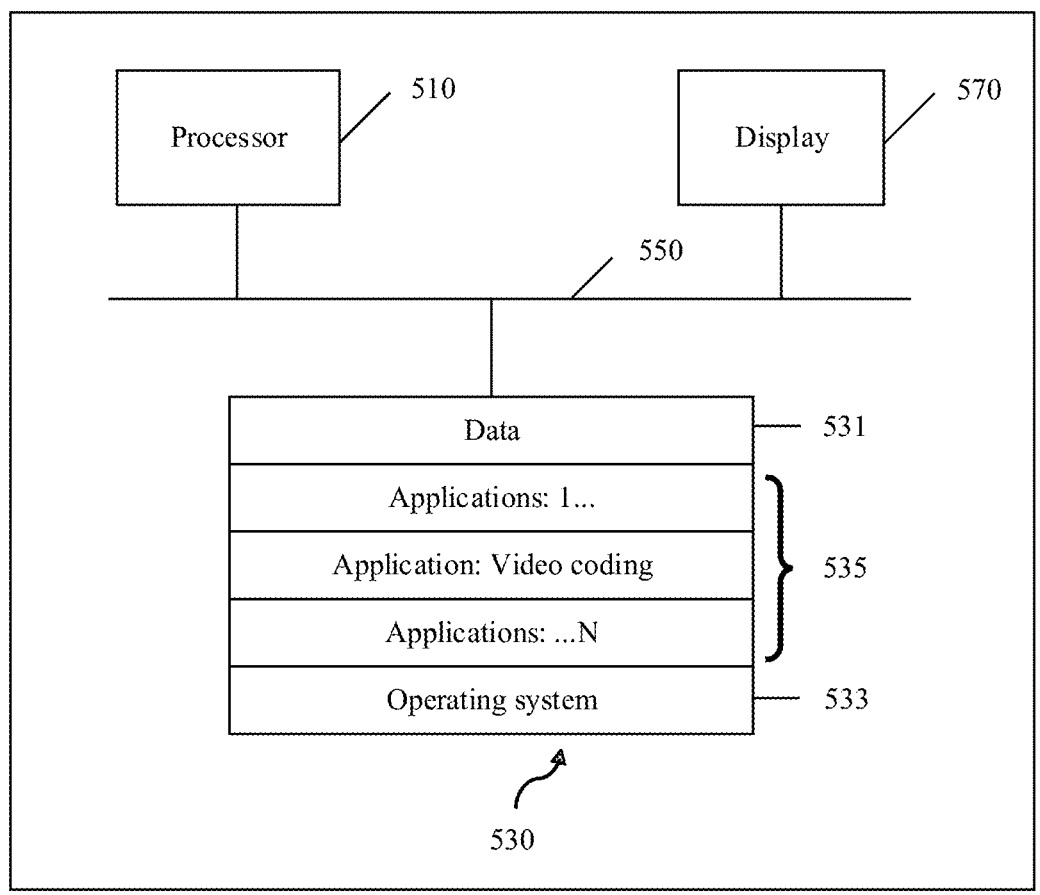
FIG. 5 is a block diagram of another example of an encoding apparatus or a decoding apparatus according to an embodiment.

FIG. 5 is simplified block diagram of an apparatus according to an embodiment. In FIG. 5, the apparatus can be used as either or both of the source device 12 and the destination device 14 in FIG. 1A according to an embodiment. The apparatus can implement the technologies of this application. In other words, FIG. 5 is a schematic block diagram of an embodiment of a coding device (e.g., an encoding device or a decoding device)) according to an embodiment. The coding device may include a processor 510, a memory 530, and a bus system 550. The processor and the memory are connected through the bus system. The memory is configured to store instructions. The processor is configured to execute the instructions stored in the memory. The memory of the coding device stores program code. The processor can invoke the program code stored in the memory, to perform the video encoding or decoding method described in this application, and in particular, various new inter prediction methods. To avoid repetition, details are not described herein again.

In this embodiment, the processor 510 may be a central processing unit (CPU), or the processor 510 may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or may be any conventional processor or the like.

The memory 530 may include a read-only memory (ROM) device or a random access memory (RAM) device. Any other suitable type of storage device may alternatively be used as the memory 530. The memory 530 may include code and data 531 accessed by the processor 510 by using the bus 550. The memory 530 may further include an operating system 533 and an application program 535. The application program 535 includes at least one program that allows the processor 510 to perform the video encoding or decoding method (in particular, the inter prediction method described in this application) described in this application. For example, the application program 535 may include applications 1 to N, and further includes a video coding application (e.g., a video encoding or decoding application) that performs the video encoding or decoding method described in this application.

The bus system 550 may not only include a data bus, but also include a power bus, a control bus, a status signal bus, and the like. However, for clear description, various types of buses in the figure are marked as the bus system 550.

In an embodiment, the coding device 500 may further include one or more output devices, for example, a display 570. In an embodiment, the display 570 may be a touch sensitive display that combines a display and a touch sensitive unit that is operable to sense a touch input. The display 570 may be connected to the processor 510 through the bus 550.

The following describes in detail the solutions in the embodiments of this application.

Inter prediction in the video encoding method or the video decoding method performed by the inter prediction unit 244, the inter prediction unit 344, the encoder 20, the decoder 30, the video coding device 400, or the coding device 500 includes determining of motion information. In an embodiment, the motion information may be determined by a motion estimation unit, and the motion information may include at least one type of reference picture information and motion vector information. The reference picture information may include at least one of the following: unidirectional/bidirectional prediction information (bidirectional prediction means that two reference blocks are required to determine a prediction block of a current picture block, and in bidirectional prediction, two groups of motion information are required to determine two reference blocks), information about a reference picture list, a reference picture index corresponding to the reference picture list. The motion vector information may include a motion vector, and the motion vector refers to location offsets in a horizontal direction and a vertical direction. The motion vector information may further include a motion vector difference (MVD). Determining of the motion information and determining of the prediction block may include one of the following modes:

In an AMVP mode, an encoder side first constructs a candidate motion vector list based on a motion vector of a spatially or temporally neighboring block (for example, but not limiting to an encoded block) of a current block, and then determines a motion vector of a motion vector predictor (MVP) of the current block from the candidate motion vector list by calculating bit rate distortion. The encoder side transfers, to a decoder side, an index value of the selected motion vector predictor in the candidate motion vector list and an index value of a reference frame (the reference frame may also be referred to as a reference picture). Further, the encoder side performs motion search in an MVP-centered neighboring domain, to obtain a better motion vector (also referred to as a motion vector target value) of the current block. The encoder side transfers a difference (e.g., motion vector difference) between the MVP and the optimal motion vector to the decoder side. The decoder side first constructs a candidate motion vector list by using a motion vector of a spatially or temporally neighboring block (for example, but not limited to a decoded block) of the current block; obtains a motion vector predictor based on the obtained index value of the motion vector predictor in the candidate motion vector list and the candidate motion vector list; obtains, based on the obtained difference between the MVP and the better motion vector, a better motion vector; and obtains, based on the better motion vector and a reference frame that is obtained based on an index value of the reference frame, a prediction block of the current block. It should be noted that, when there is one candidate in the candidate motion vector list, an index value of a selected motion vector predictor in the candidate motion vector list may not be transmitted.

The encoder side may be the source device 12, the video coding system 40, the encoder 20, the video coding device 400, or the coding device 500. The decoder side may be the destination device 14, the video coding system 40, the decoder 30, the video coding device 400, or the coding device 500. The index value of the motion vector predictor in the candidate motion vector list and the index value of the reference frame (the reference frame may also be referred to as a reference picture) may be syntax elements used for transmission in the foregoing descriptions.

Figure 6:
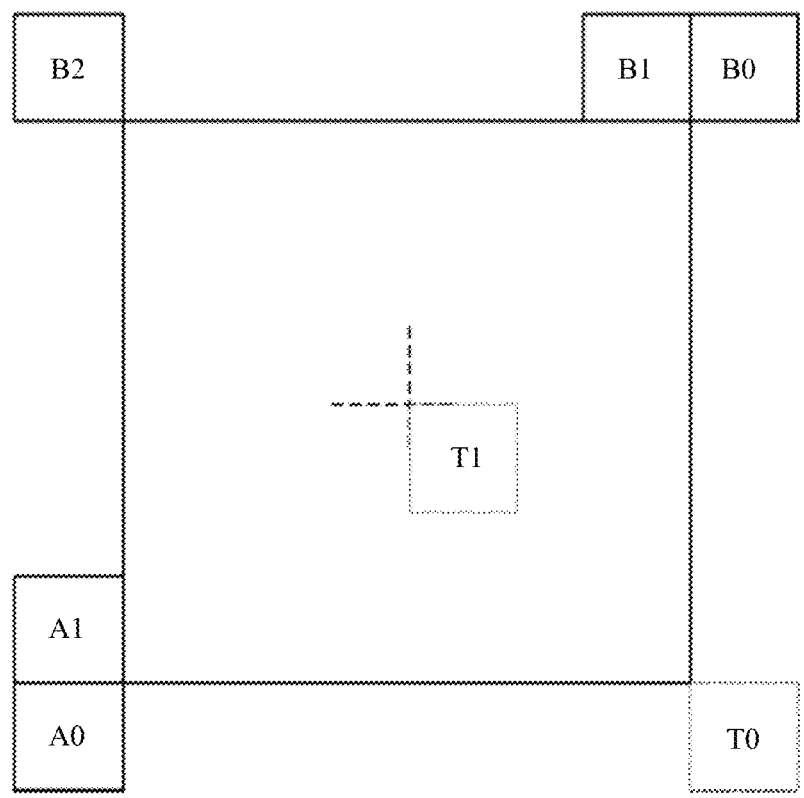
FIG. 6 is an example block diagram of spatial neighboring blocks and temporal neighboring blocks according to an embodiment.

In a merge mode, an encoder side first constructs a candidate motion information list based on motion information of a spatially or temporally neighboring block (for example, but not limited to an encoded block) of a current block; determines, as motion information of the current block, optimal motion information from the candidate motion information list by calculating rate distortion; and transfers, to a decoder side, an index value (denoted as a merge index, which is also applied to the following descriptions) of a location of the optimal motion information (which is also referred to as motion information of the current block or prediction information of motion information of the current block) the candidate motion information list. Spatial and temporal candidate motion information of the current block is shown in FIG. 6. The spatial candidate motion information is motion information of five spatially neighboring blocks (A0, A1, B0, B1, and B2). If a neighboring block is unavailable or an intra coding mode is used, the spatial candidate motion information is not added into the candidate motion information list. The temporal candidate motion information of the current block is obtained by scaling an MV of a collocated block in a reference frame based on the reference frame and a picture order count (POC) of a current frame. Whether a block at a location T0 in the reference frame is available is first determined. If the block is not available, a block at a location T1 is selected. The decoder side first constructs a candidate motion information list based on motion information of a spatially or temporally neighboring block (for example, but not limited to a decoded block) of the current block, where the motion information in the motion information list includes a motion vector and an index value of a reference frame. The decoder side then obtains optimal motion information based on the candidate motion information list and an index value of a location of the optimal motion information in the candidate motion information list, and obtains a prediction block of the current block based on the optimal motion information. It should be noted that, when there is one candidate in the candidate motion information list, the index value of the location of the optimal motion information in the candidate motion information list may not be transmitted.

It should be noted that, the candidate motion information list in the embodiments of the present invention is constructed based on the motion information of the spatially or temporally neighboring block of the current block, but this is not limited. The candidate motion information list may be constructed or refined by using at least one of the following: the motion information of the spatially neighboring block, the motion information of the temporally neighboring block, a pairwise average merging candidate (pairwise average merging candidates), a history-based merging candidate (history-based merging candidates), and a zero motion vector candidate (zero motion vector merging candidates). For detailed descriptions of the construction process, refer to JVET-L1001-v6. The embodiments of the application are not limited thereto.

In a merge mode with motion vector difference (MMVD), there is additionally MVD transmission based on the merge mode. Specifically, the encoder side further performs motion search in a neighboring domain centering at the optimal motion information in the candidate motion information list, to obtain a better motion vector (which may also be referred to as a motion vector target value) of the current block; and the encoder side transmits, to the decoder side, a difference (e.g., motion vector difference) between the better motion vector and a motion vector included in the optimal motion information in the candidate motion information list. After obtaining the optimal motion information, the decoder side further obtains a better motion vector based on the difference and the motion vector included in the optimal motion information in the candidate motion information list, and then obtains a prediction block of the current block based on the better motion vector and the reference frame indicated by the index value of the reference frame included in the optimal motion information in the candidate motion information list.

It should be noted that the MMVD mode is a mode in which there is additionally MVD transmission based on a skip mode. In comparison with the merge mode, the skip mode can be understood as that residual information between the prediction block of the current block and an original block of the current block. Similarly, based on the skip mode, the encoder side further performs motion search in a neighboring domain centering at the optimal motion information in the candidate motion information list, to obtain a better motion vector of the current block; and the encoder side transmits, to the decoder side, a difference (e.g., motion vector difference) between the better motion vector and a motion vector included in the optimal motion information in the candidate motion information list. After obtaining the optimal motion information, the decoder side further obtains a better motion vector based on the difference and the motion vector included in the optimal motion information in the candidate motion information list, and then obtains a prediction block of the current block based on the better motion vector and the reference frame indicated by the index value of the reference frame included in the optimal motion information in the candidate motion information list. For descriptions of the skip mode, refer to an existing H.266 draft (working draft, for example, JVET-L1001-v6). Details are not described herein again.

In the MMVD mode, merge candidates in the VVC are used. One or more of the merge candidates are selected, and then MV extension expression is performed based on the selected one or more candidates. The MV extension expression is implemented by using a simplified identification method. The identification method includes identifying a start point of an MV, a motion step, and a motion direction. By using an existing merge candidate list, the selected candidate may be a MRG_TYPE_DEFAULT_N mode. An initial location of the MV is determined based on the selected candidate. A base candidate IDX (Table 1) indicates a specific candidate that is selected as a best candidate in the candidate list.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

The base candidate IDX represents an index value of a location of optimal motion information in the candidate motion information list. The $N^{th}$ MVP indicates that an $N^{th}$ item in the candidate motion information list is an MVP.

When an MVD is transmitted, an offset value such as x and y may be transmitted; a length of the MVD and a direction of the MVD may be transmitted; or an index value (indicating a ¼ pixel distance to a 32 pixel distance) of a length of the MVD and an index value of a direction (up, down, left, or right) of the MVD may be transmitted.

The index value of the length of the MVD is used to indicate the length of the MVD. A correspondence between the index value (Distance IDX) of the length of the MVD and the length (Pixel distance) of the MVD may be preset, and the correspondence may be shown in Table 2.

TABLE 2

| Distance IDX | 0 | 1 | 2 | 3 | 4 | 5 | 6 | 7 |
|---|---|---|---|---|---|---|---|---|
| Pixel distance | ¼-pel | ½-pel | 1-pel | 2-pel | 4-pel | 8-pel | 16-pel | 32-pel |

The index value of the direction of the MVD is used to indicate the direction of the MVD. A correspondence between the index value (Direction IDX) of the direction of the MVD and the direction (x-axis or y-axis) of the MVD may be preset, and the correspondence may be shown in Table 3.

TABLE 3

| Direction IDX | 0 | 1 | 2 | 3 |
|---|---|---|---|---|
| x-axis | + | − | N/A | N/A |
| y-axis | N/A | N/A | + | − |

In Table 3, if a value of y-axis is N/A, it may indicate that the direction of the MVD is unrelated to a direction in the y axis; and if a value of x-axis is N/A, it may indicate that the direction of the MVD is unrelated to a direction in the x axis.

In a decoding process, an MMVD flag (mmvd_flag, used to indicate whether the current block is decoded in the MMVD mode) is parsed after a skip flag (cu_skip_flag, used to indicate whether the current block is decoded in the skip mode) or a merge flag (merge_flag, used to indicate whether the current block is decoded in the merge mode). If the skip flag or the merge flag is true, a value of the MMVD flag needs to be parsed. If the MMVD flag is true, the other flag value corresponding to the MMVD need to be encoded or decoded.

Further, in a bidirectional inter prediction (or referred to as bidirectional prediction) scenario, a decoder side or an encoder side may decode or encode MVD information of only one direction, and MVD information of the other direction may be obtained based on the MVD information of the one direction. A specific process may be as follows:

Whether a reference frame corresponding to an MVD of one direction and a reference frame corresponding to the MVD in the other direction are in a same direction or in opposite directions may be specifically determined based on a POC value of a frame in which the current block is located and POC values of the reference frames in the two directions. For example, if a plus or minus sign of a first difference obtained by subtracting a POC value of a reference frame in one direction from a POC value of a frame in which a current block is located is the same as a plus or minus sign of a second difference obtained by subtracting a POC value of a reference frame in the other direction from the POC value of the frame in which the current block is located, the reference frame corresponding to the MVD in one direction and the reference frame corresponding to the MVD in the other direction are in a same direction. Otherwise, if a plus or minus sign of a first difference obtained by subtracting a POC value of a reference frame in one direction from a POC value of a frame in which a current block is located is opposite to a plus or minus sign of a second difference obtained by subtracting a POC value of a reference frame in the other direction from the POC value of the frame in which the current block is located, the reference frame corresponding to the MVD in one direction and the reference frame corresponding to the MVD in the other direction are in different directions.

It should be noted that a direction of a reference frame may be the direction of the reference frame relative to a direction of a current frame (the frame in which the current block is located), or a direction of a current frame relative to the direction of the reference frame. In an embodiment, whether the reference frame corresponding to the MVD of one direction and the reference frame corresponding to the MVD in the other direction are in a same direction or in opposite directions may be determined based on a difference obtained by subtracting the POC value of the current frame from the POC value of the current frame, or may be determined based on a difference obtained by subtracting the POC value of the current frame from the POC value of the reference frame.

When the reference frame corresponding to the MVD in one direction and the reference frame corresponding to the MVD in the other direction are in a same direction, a sign of the MVD in the other direction is the same as a sign of the MVD in the one direction. For example, if the MVD in the one direction is (x, y), the MVD in the other direction is (x, y). In an embodiment, the MVD in the one direction may be obtained based on an index value of a length of the MVD in the one direction and an index value of a direction of the MVD in the one direction.

Alternatively, when the reference frame corresponding to the MVD in one direction and the reference frame corresponding to the MVD in the other direction are in different directions, a sign of the MVD in the other direction is opposite to a sign of the MVD in the one direction. For example, if the MVD in the one direction is (x, y), the MVD in the other direction is (−x, −y).

The MVD in the other direction is scaled based on the MVD in the one direction, a first POC difference, and a second POC difference, to obtain a better MVD in the other direction. The first POC difference is the difference between the POC value of the frame in which the current block is located and the POC value of the reference frame corresponding to the MVD in the one direction, and the second POC difference is the difference between the POC value of the frame in which the current block is located and the POC value of the reference frame corresponding to the MVD in the other direction. For specific descriptions of a scaling method, refer to the existing H.266 draft (working draft, for example, JVET-L1001-v6). Details are not described herein.

The foregoing MVD solution can be further optimized. For example, an index value with a relatively large value of pixel distance is seldom used, and the value of the direction of the MVD can indicate only four directions; and the step (3) of scaling the MVD in the other direction based on the MVD in the one direction, a first POC difference, and a second POC difference, to obtain a better MVD in the other direction is complex in the specific process. Therefore, the embodiments of the present invention provide a series of improved solutions.

Figure 7:
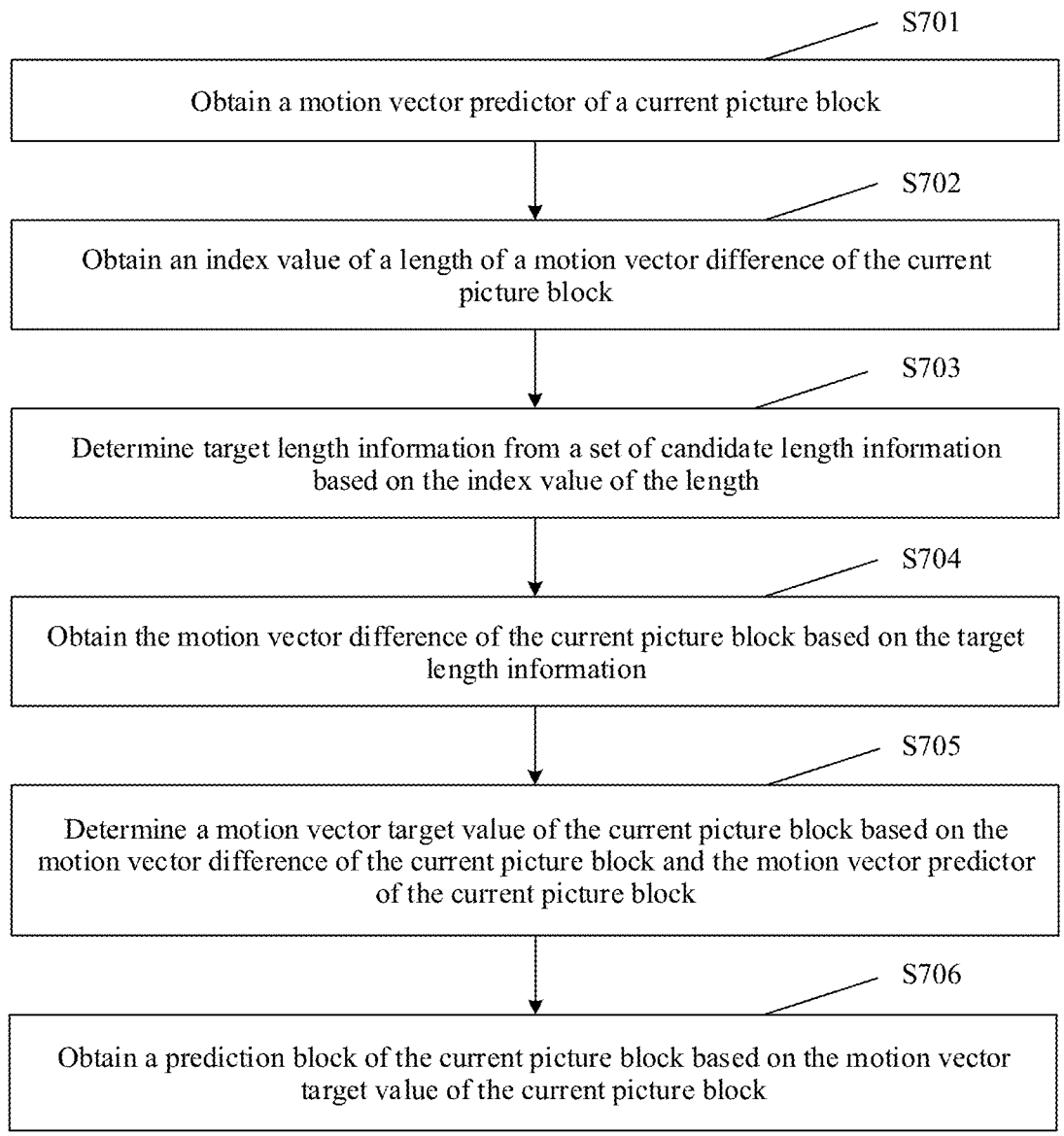
FIG. 7 is a schematic flowchart of an inter prediction method according to an embodiment.

FIG. 7 is a schematic flowchart of an inter prediction method according to an embodiment. The method may be performed by the destination device 14, the video coding system 40, the decoder 30, the video coding device 400, or the coding device 500. The method may be performed by the video decoder 30, or performed by the entropy decoding unit 304 and the prediction processing unit 360 (or, for example, the inter prediction unit 344 in the prediction processing unit 360). The method may include the following operations.

S701: Obtain a motion vector predictor of a current picture block.

In an embodiment, the obtaining a motion vector predictor of a current picture block may include: constructing a candidate motion information list of the current picture block, where the candidate motion information list includes L motion vectors, and L is 1, 3, 4, or 5; obtaining an index value of prediction information of motion information of the current picture block in the candidate motion information list, where the prediction information of motion information of the current picture block includes the motion vector predictor; and obtaining the motion vector predictor based on the index value of the motion information of the current picture block in the candidate motion information list and the candidate motion information list. The candidate motion information list of the current picture block may be a merge candidate motion information list. Correspondingly, the inter prediction method provided in this embodiment of the present invention may be applied to an MMVD mode.

The index value in the candidate motion information list may be an index value in a variable-length coding form. For example, when L is 3, 1 may be used to indicate a first item in the candidate motion information list, 01 may be used to indicate a second item in the candidate motion information list, and 00 may be used to indicate a third item in the candidate motion information list. Alternatively, when L is 4, 1 may be used to indicate a first item in the candidate motion information list, 01 may be used to indicate a second item in the candidate motion information list, 001 may be used to indicate a third item in the candidate motion information list, and 000 may be used to indicate a fourth item in the candidate motion information list. Others may be deduced by analogy.

For the manner of obtaining the motion vector predictor by constructing the candidate motion information list of the current picture block, refer to the foregoing descriptions of the modes such as the AMVP mode, the merge mode, the MMVD mode, or the skip mode. Details are not described herein again.

S702: Obtain an index value of a length of a motion vector difference of the current picture block, where the motion vector difference of the current picture block is used to indicate a difference between the motion vector predictor and a motion vector target value of the current picture block.

The index value of the length of the motion vector difference may be used to indicate one piece of candidate length information in a set of candidate length information.

The set of candidate length information may include at least two pieces of candidate length information, or may include one piece of candidate length information.

One piece of candidate length information may be used to indicate a length of one motion vector difference, and the candidate length information may be a length value, or may be information used to derive a length value. The length may be represented by using a Euclidean distance, or the length may include an absolute value of a component x and an absolute value of a component y of the motion vector difference. Certainly, the length may alternatively be represented by using another norm. This is not limited herein.

It should be noted that, because a motion vector is a two-dimensional array, the motion vector difference may be represented by using a two-dimensional array. If a motion vector is a three-dimensional array, the motion vector difference may be represented by a three-dimensional array.

S703: Determine target length information from the set of candidate length information based on the index value of the length, where the set of candidate length information includes candidate length information of only N motion vector differences, and N is a positive integer greater than 1 and less than 8.

N may be 4. In some embodiments, index values of different lengths may indicate different lengths. For example, the candidate length information of the N motion vector differences includes at least one of the following: When the index value of the length is a first preset value, a length indicated by the target length information is one quarter of a pixel length; when the index value of the length is a second preset value, a length indicated by the target length information is a half of a pixel length; when the index value of the length is a third preset value, a length indicated by the target length information is one pixel length; or when the index value of the length is a fourth preset value, a length indicated by the target length information is two pixel lengths. It should be noted that the first preset value to the fourth preset value may not be sequential, and they are independent of each other and are merely used to distinguish between different preset values. Certainly, the first preset value to the fourth preset value may alternatively be sequential, or have a sequence attribute. In some embodiments, a correspondence between an index value of a length and a length of an MVD may be shown in Table 4:

TABLE 4

| Index value of a length of an MVD | 0 | 1 | 2 | 3 |
|---|---|---|---|---|
| Length of an MVD | 1/4-pel | 1/2-pel | 1-pel | 2-pel |
| MmvdDistance | 1 | 2 | 3 | 4 |

"pel" has a same meaning as "pixel". For example, ¼-pel indicates a length of one quarter of a pixel. For similar descriptions, refer to the descriptions in Table 2.

MmvdDistance represents a value for obtaining a length of an MVD. For example, the value of the length of the MVD can be obtained by shifting MmvdDistance rightward by two bits.

S704: Obtain the motion vector difference of the current picture block based on the target length information.

The method may further include: obtaining an index value of a direction of the motion vector difference of the current picture block; and determining target direction information from candidate direction information of M motion vector differences based on the index value of the direction, where M is a positive integer greater than 1.

The candidate direction information of the M motion vector differences may be M pieces of candidate direction information.

The index value of the direction of the motion vector difference may be used to indicate one piece of candidate direction information in the candidate direction information of the M motion vector differences.

One piece of candidate direction information may be used to indicate a direction of one motion vector difference. In an embodiment, the candidate direction information may be a sign indicating a plus or minus sign, and the sign may be a sign of a component x of a motion vector difference, or a sign of a component y of a motion vector difference, or a sign of a component x and a sign of a component y of a motion vector. Alternatively, the candidate direction information may be information used to derive the sign.

In an embodiment, the obtaining the motion vector difference of the current picture block based on the target length information may include: determining the motion vector difference of the current picture block based on the target direction information and the target length informa-tion.

S705: Determine the motion vector target value of the current picture block based on the motion vector difference of the current picture block and the motion vector predictor of the current picture block.

In some embodiments, a sum of the motion vector difference of the current picture block and the motion vector predictor of the current picture block may be used as the motion vector target value of the current picture block.

S706: Obtain a prediction block of the current picture block based on the motion vector target value of the current picture block.

For more content of inter prediction, refer to the foregoing descriptions. Details are not described herein again.

Figure 8:
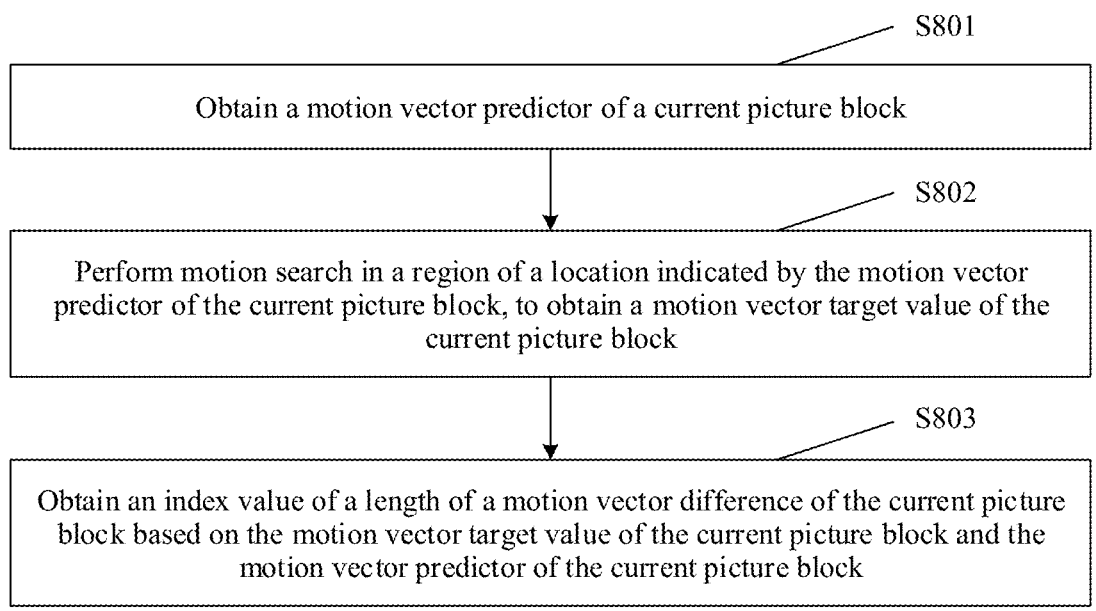
FIG. 8 is a schematic flowchart of an inter prediction method according to an embodiment.

FIG. 8 is a schematic flowchart of an inter prediction method according to an embodiment. The method may be performed by the source device 12, the video coding system 40, the encoder 20, the video coding device 400, or the coding device 500. The method may be performed by the prediction processing unit 260 (or, for example, the inter prediction unit 244 in the prediction processing unit 260) in the encoder 30. The method may include the following operations.

S801: Obtain a motion vector predictor of a current picture block.

For the process, refer to the foregoing descriptions of the AMVP mode, the merge mode, the MMVD mode, or the skip mode. Details are not described herein again.

S802: Perform motion search in a region of a location indicated by the motion vector predictor of the current picture block, to obtain a motion vector target value of the current picture block.

S803: Obtain an index value of a length of a motion vector difference of the current picture block based on the motion vector target value of the current picture block and the motion vector predictor of the current picture block, where the motion vector difference of the current picture block is used to indicate a difference between the motion vector predictor and the motion vector target value of the current picture block, the index value of the length of the motion vector difference of the current picture block is used to indicate one piece of candidate length information in a set of preset candidate length information, the set of candidate length information includes candidate length information of only N motion vector differences, and N is a positive integer greater than 1 and less than 8.

The obtaining an index value of a length of a motion vector difference of the current picture block based on the motion vector target value of the current picture block and the motion vector predictor of the current picture block may include: obtaining the motion vector difference of the current picture block based on the motion vector target value of the current picture block and the motion vector predictor of the current picture block; and determining the index value of the length of the motion vector difference of the current picture block and an index value of a direction of the motion vector difference of the current picture block based on the motion vector difference of the current picture block.

N may be 4.

FIG. 8 describes an encoder side method corresponding to the decoder side method described in FIG. 7. For related descriptions, refer to FIG. 7 or the foregoing related descriptions. Details are not described herein again.

Figure 9:
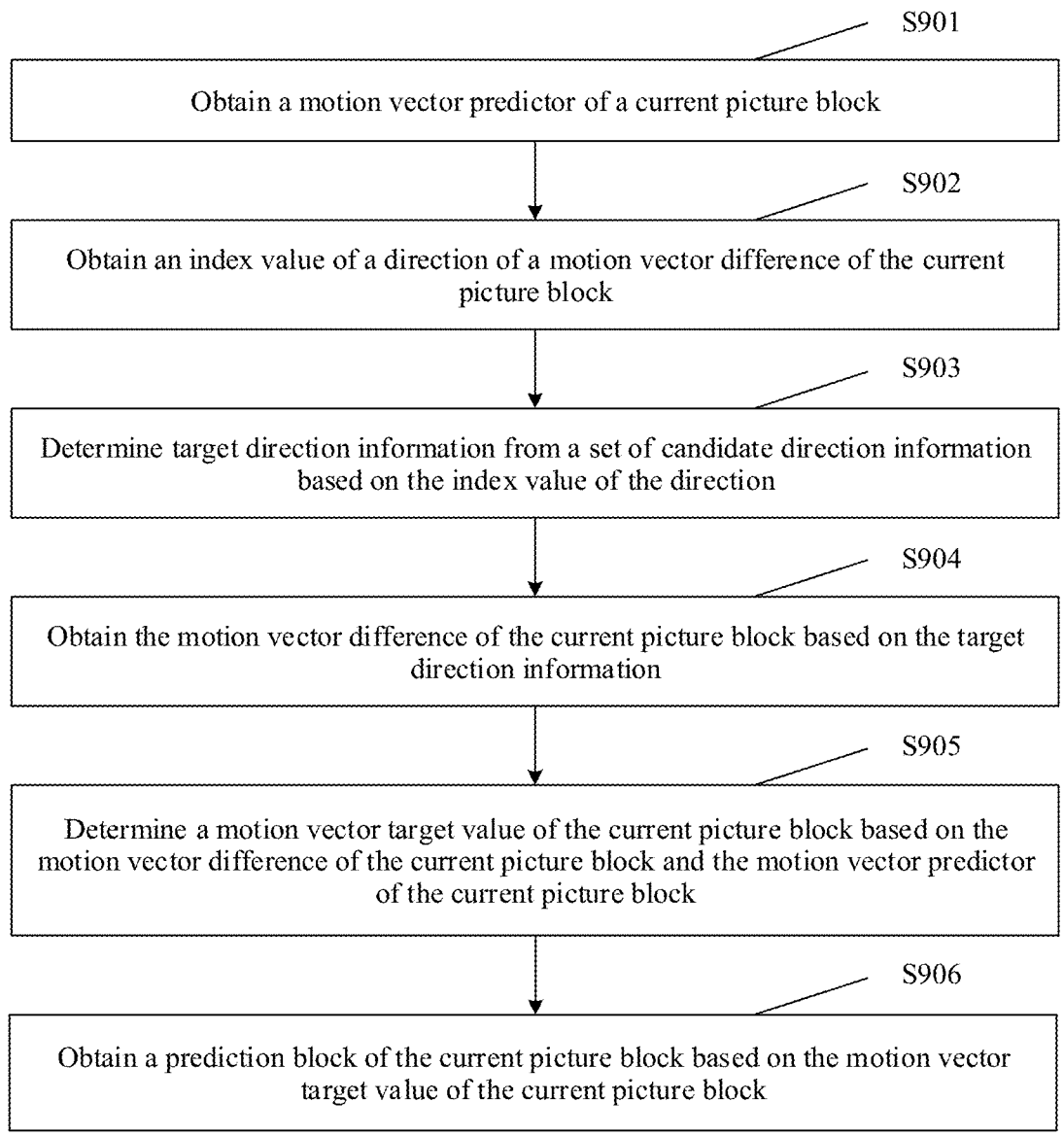
FIG. 9 is a schematic flowchart of an inter prediction method according to an embodiment.

FIG. 9 is a schematic flowchart of an inter prediction method according to an embodiment. The method may be performed by the destination device 14, the video coding system 40, the decoder 30, the video coding device 400, or the coding device 500. The method may be performed by the video decoder 30, or performed by the entropy decoding unit 304 and the prediction processing unit 360 (or, for example, the inter prediction unit 344 in the prediction processing unit 360). The method may include the following operations.

S901: Obtain a motion vector predictor of a current picture block.

In an embodiment, the obtaining a motion vector predictor of a current picture block may include: constructing a candidate motion information list of the current picture block, where the candidate motion information list includes L motion vectors, and L is 1, 3, 4, or 5; obtaining an index value of prediction information of motion information of the current picture block in the candidate motion information list, where the prediction information of motion information of the current picture block includes the motion vector predictor; and obtaining the motion vector predictor based on the index value of the motion information of the current picture block in the candidate motion information list and the candidate motion information list. The candidate motion information list of the current picture block may be a merge candidate motion information list. Correspondingly, the inter prediction method provided in this embodiment of the present invention may be applied to an MMVD mode.

For the manner of obtaining the motion vector predictor by constructing the candidate motion information list of the current picture block, refer to the foregoing descriptions of the modes such as the AMVP mode, the merge mode, the MMVD mode, or the skip mode. Details are not described herein again.

S902: Obtain an index value of a direction of a motion vector difference of the current picture block, where the motion vector difference of the current picture block is used to indicate a difference between the motion vector predictor and a motion vector target value of the current picture block.

The index value of the direction of the motion vector difference may be used to indicate one piece of candidate direction information in a set of candidate direction information.

The set of candidate direction information may include at least two pieces of candidate direction information, or may include one piece of candidate direction information.

One piece of candidate direction information may be used to indicate a direction of one motion vector difference. In an embodiment, the candidate direction information may be a sign indicating a plus or minus sign, and the sign may be a sign of a component x of a motion vector difference, or a sign of a component y of a motion vector difference, or a sign of a component x and a sign of a component y of a motion vector. Alternatively, the candidate direction information may be information used to derive the sign.

It should be noted that, because a motion vector is a two-dimensional array, the motion vector difference may be represented by using a two-dimensional array. If a motion vector is a three-dimensional array, the motion vector difference may be represented by a three-dimensional array.

S903: Determine target direction information from a set of candidate direction information based on the index value of the direction, where the set of candidate direction information includes candidate direction information of M motion vector differences, and M is a positive integer greater than 4.

M may be 8. In some embodiments, index values of different directions may indicate different directions. For example, the candidate direction information of the M motion vector differences may include at least one of the following: When the index value of the direction is a first preset value, a direction indicated by the target direction information is exactly right; when the index value of the direction is a second preset value, a direction indicated by the target direction information is exactly left; when the index value of the direction is a third preset value, a direction indicated by the target direction information is exactly down; when the index value of the direction is a fourth preset value, a direction indicated by the target direction information is exactly up; when the index value of the direction is a fifth preset value, a direction indicated by the target direction information is lower right; when the index value of the direction is a sixth preset value, a direction indicated by the target direction information is upper right; when the index value of the direction is a seventh preset value, a direction indicated by the target direction information is lower left; or when the index value of the direction is an eighth preset value, a direction indicated by the target direction information is upper left. It should be noted that the first preset value to the eighth preset value may not be sequential, and they are independent of each other and are merely used to distinguish between different preset values. Certainly, the first preset value to the eighth preset value may alternatively be sequential, or have a sequence attribute.

In some embodiments, a correspondence between an index value of a direction and a direction of an MVD may be shown in Table 5, Table 6, or Table 7.

TABLE 5

| Index value of a direction of an MVD | 000 | 001 | 010 | 011 | 100 | 101 | 110 | 111 |
|---|---|---|---|---|---|---|---|---|
| x-axis | + | − | N/A | N/A | + | + | − | − |
| y-axis | N/A | N/A | + | − | + | − | + | − |

TABLE 6

| Index value of a direction of an MVD | 0 | 1 | 2 | 3 | 4 | 5 | 6 | 7 |
|---|---|---|---|---|---|---|---|---|
| x-axis | +1 | −1 | 0 | 0 | +1 | +1 | −1 | −1 |
| y-axis | 0 | 0 | +1 | −1 | +1 | −1 | +1 | −1 |

TABLE 7

| Index value of a direction of an MVD | 0 | 1 | 2 | 3 | 4 | 5 | 6 | 7 |
|---|---|---|---|---|---|---|---|---|
| x-axis | +1 | −1 | 0 | 0 | +0.5 | +0.5 | −0.5 | −0.5 |
| y-axis | 0 | 0 | +1 | −1 | +0.5 | −0.5 | +0.5 | −0.5 |

In Table 5, if a value of x-axis is "+", it may indicate that the direction of the MVD is a positive direction of the x-axis. If a value of y-axis is "+", it may indicate that the direction of the MVD is a positive direction of the y-axis. If a value of x-axis is "−", it may indicate that the direction of the MVD is a negative direction of the x-axis. If a value of y-axis is "−", it may indicate that the direction of the MVD is a negative direction of the y-axis. If a value of x-axis is N/A, it may indicate that the direction of the MVD is unrelated to a direction in the x-axis. If a value of y-axis is N/A, it may indicate that the direction of the MVD is unrelated to a direction in the y-axis. If a value of x-axis and a value of y-axis are both "+", it may indicate that the direction of the MVD whose projection in the x-axis direction is a positive direction and the direction of the MVD whose projection in the y-axis direction is also a positive direction. If a value of x-axis and a value of y-axis are both "−", it may indicate that the direction of the MVD whose projection in the x-axis direction is a negative direction and the direction of the MVD whose projection in the y-axis direction is also a negative direction. If a value of x-axis is "+" and a value of y-axis is "−", it may indicate that the direction of the MVD whose projection in the x-axis direction is a positive direction and the direction of the MVD whose projection in the y-axis direction is a negative direction. If a value of x-axis is "−" and a value of y-axis is "+", it may indicate that the direction of the MVD whose projection in the x-axis direction is a negative direction and the direction of the MVD whose projection in the y-axis direction is a positive direction. The positive direction of the x-axis may indicate a leftward direction, and the positive direction of the y-axis may indicate a downward direction.

In Table 6 or Table 7, the x-axis may represent a sign coefficient of the component x of the MVD, and a product of the sign coefficient of the component x and an absolute value of the component x of the MVD is the component x of the MVD. The y-axis may represent a sign coefficient of the component y of the MVD, and a product of the sign coefficient of the component y and the absolute value of the component y is the component y of the MVD.

S904: Obtain the motion vector difference of the current picture block based on the target direction information.

The method may further include: obtaining an index value of a length of the motion vector difference of the current picture block; and determining target length information from the candidate length information of the N motion vector differences based on the index value of the length, where N is a positive integer greater than 1.

The candidate length information of the N motion vector differences may be the set of candidate length information in the embodiment in FIG. 7, and may be the set of candidate length information provided in Table 4. For descriptions of the length of the motion vector difference, the index value of the length of the motion vector difference, the candidate length information, and the motion vector difference, refer to FIG. 7 or the foregoing descriptions. Details are not described herein again.

In an embodiment, the obtaining the motion vector difference of the current picture block based on the target direction information may include: determining the motion vector difference of the current picture block based on the target direction information and the target length information.

S905: Determine the motion vector target value of the current picture block based on the motion vector difference of the current picture block and the motion vector predictor of the current picture block.

In some embodiments, a sum of the motion vector difference of the current picture block and the motion vector predictor of the current picture block may be used as the motion vector target value of the current picture block.

S906: Obtain a prediction block of the current picture block based on the motion vector target value of the current picture block.

For more content of inter prediction, refer to the foregoing descriptions. Details are not described herein again.

For content of the embodiment in FIG. 9 similar to content in FIG. 7 and the foregoing descriptions, refer to FIG. 7 and the foregoing descriptions. Details are not described herein again.

Figure 10:
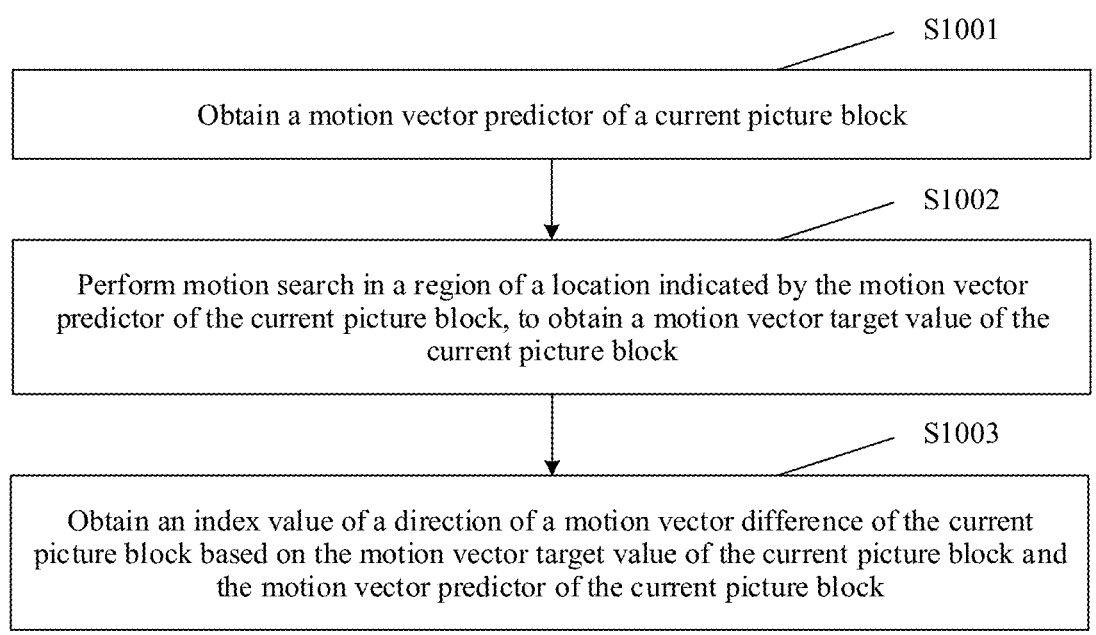
FIG. 10 is a schematic flowchart of an inter prediction method according to an embodiment.

FIG. 10 is a schematic flowchart of an inter prediction method according to an embodiment. The method may be performed by the source device 12, the video coding system 40, the encoder 20, the video coding device 400, or the coding device 500. The method may be performed by the prediction processing unit 260 (or, for example, the inter prediction unit 244 in the prediction processing unit 260) in the encoder 30. The method may include the following operations.

S1001: Obtain a motion vector predictor of a current picture block.

For the process, refer to the foregoing descriptions of the AMVP mode, the merge mode, the MMVD mode, or the skip mode. Details are not described herein again.

S1002: Perform motion search in a region of a location indicated by the motion vector predictor of the current picture block, to obtain a motion vector target value of the current picture block.

S1003: Obtain an index value of a direction of a motion vector difference of the current picture block based on the motion vector target value of the current picture block and the motion vector predictor of the current picture block, where the motion vector difference of the current picture block is used to indicate a difference between the motion vector predictor and the motion vector target value of the current picture block, the index value of the direction of the motion vector difference of the current picture block is used to indicate one piece of candidate direction information in a set of preset candidate direction information, the set of candidate direction information includes candidate length information of M motion vector differences, and M is a positive integer greater than 4.

The obtaining an index value of a direction of a motion vector difference of the current picture block based on the motion vector target value of the current picture block and the motion vector predictor of the current picture block may include: obtaining the motion vector difference of the current picture block based on the motion vector target value of the current picture block and the motion vector predictor of the current picture block; and determining an index value of a length of the motion vector difference of the current picture block and the index value of the direction of the motion vector difference of the current picture block based on the motion vector difference of the current picture block.

M may be 8.

FIG. 10 describes an encoder side method corresponding to the decoder side method described in FIG. 9. For related descriptions, refer to FIG. 9 or the foregoing related descriptions. Details are not described herein again.

Figure 11:
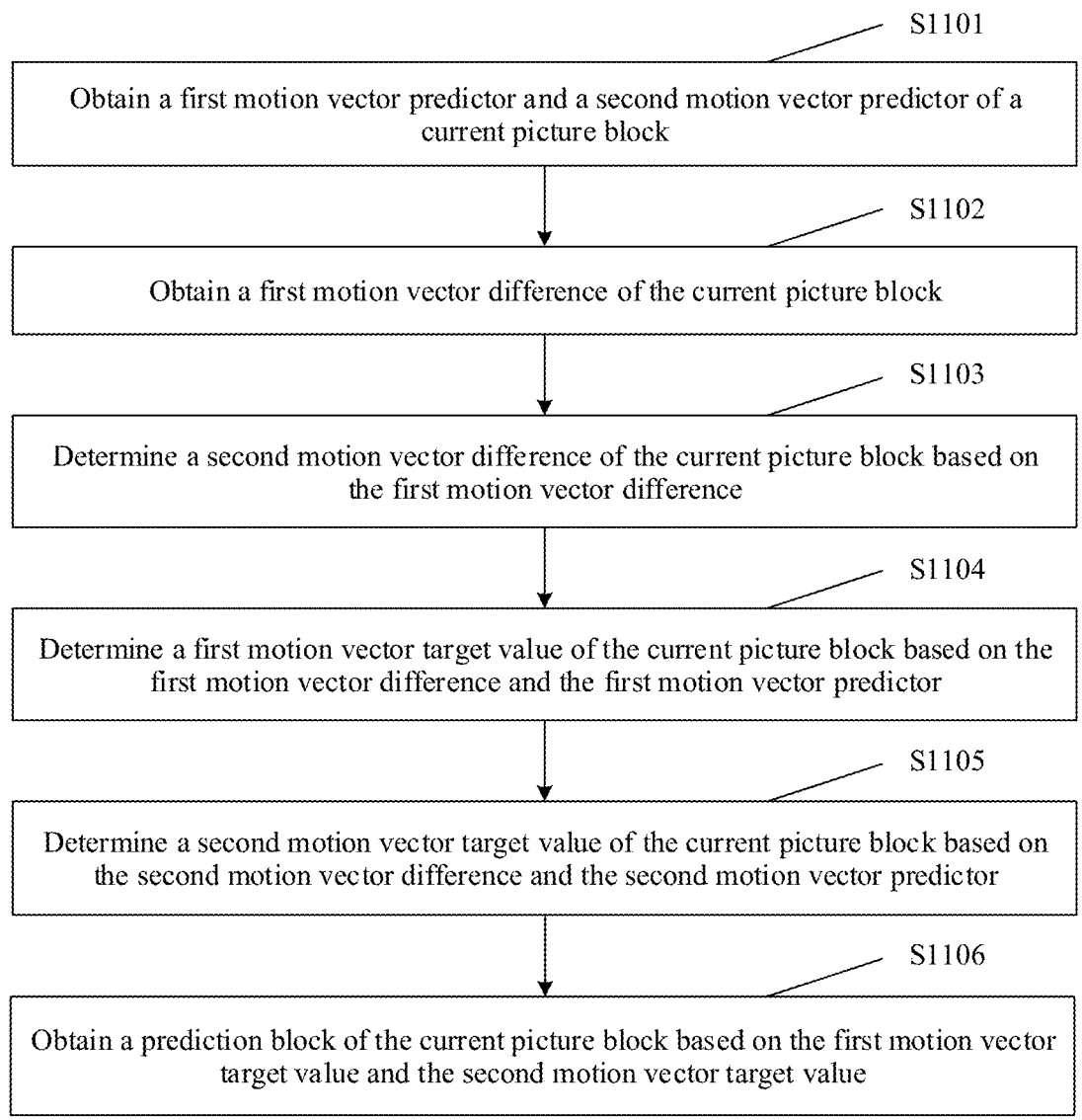
FIG. 11 is a schematic flowchart of an inter prediction method according to an embodiment.

FIG. 11 is a schematic flowchart of an inter prediction method according to an embodiment. The method may be performed by the destination device 14, the video coding system 40, the decoder 30, the video coding device 400, or the coding device 500. The method may be performed by the video decoder 30, or performed by the entropy decoding unit 304 and the prediction processing unit 360 (or, for example, the inter prediction unit 344 in the prediction processing unit 360). The method may include the following operations.

S1101: Obtain a first motion vector predictor of a current picture block and a second motion vector predictor of the current picture block, where the first motion vector predictor corresponds to a first reference frame, and the second motion vector predictor corresponds to a second reference frame.

S1102: Obtain a first motion vector difference of the current picture block, where the first motion vector difference of the current picture block is used to indicate a difference between the first motion vector predictor and a first motion vector target value of the current picture block, and the first motion vector target value and the first motion vector predictor correspond to a same reference frame.

S1103: Determine a second motion vector difference of the current picture block based on the first motion vector difference, where the second motion vector difference of the current picture block is used to indicate a difference between the second motion vector predictor and a second motion vector target value of the current picture block, the second motion vector target value and the second motion vector predictor correspond to a same reference frame, and when a direction of the first reference frame relative to a current frame in which the current picture block is located is the same as a direction of the second reference frame relative to the current frame, the second motion vector difference is the first motion vector difference, or when the direction of the first reference frame relative to the current frame in which the current picture block is located is opposite to the direction of the second reference frame relative to the current frame, a plus or minus sign of the second motion vector difference is opposite to a plus or minus sign of the first motion vector difference, and an absolute value of the second motion vector difference is the same as an absolute value of the first motion vector difference.

S1104: Determine the first motion vector target value of the current picture block based on the first motion vector difference and the first motion vector predictor.

The first motion vector target value may be a sum of the first motion vector difference and the first motion vector predictor.

S1105: Determine the second motion vector target value of the current picture block based on the second motion vector difference and the second motion vector predictor.

The second motion vector target value may be a sum of the second motion vector difference and the second motion vector predictor.

S1106: Obtain a prediction block of the current picture block based on the first motion vector target value and the second motion vector target value.

For content of the embodiment in FIG. 11 similar to content in the foregoing descriptions, refer to the foregoing descriptions. Details are not described herein again.

Figure 12:
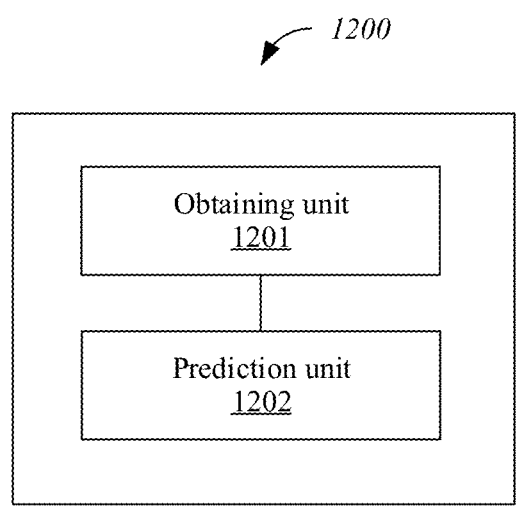
FIG. 12 is a schematic block diagram of an inter prediction apparatus according to an embodiment.

Based on a same inventive concept as the foregoing method, as shown in FIG. 12, an embodiment further provides an inter prediction apparatus 1200. The inter prediction apparatus 1200 may be the destination device 14, the video coding system 40, the decoder 30, the video coding device 400, or the coding device 500; or may be a component of the destination device 14, the video coding system 40, the decoder 30, the video coding device 400, or the coding device 500. Alternatively, the inter prediction apparatus 1200 may include the entropy decoding unit 304 and the prediction processing unit 360 (or for example, the inter prediction unit 344 in the prediction processing unit 360). The inter prediction apparatus 1200 includes an obtaining unit 1201 and a prediction unit 1202. The obtaining unit 1201 and the prediction unit 1202 may be implemented by using software. For example, the obtaining unit 1201 and the prediction unit 1202 may be software modules, or the obtaining unit 1201 and the prediction unit 1202 are a processor and a memory that execute instructions. The obtaining unit 1201 and the prediction unit 1202 may alternatively be implemented by using hardware. For example, the obtaining unit 1201 and the prediction unit 1202 may be modules in a chip.

The prediction unit 1202 may be configured to obtain a motion vector predictor of a current picture block.

The obtaining unit 1201 may be configured to obtain an index value of a length of a motion vector difference of the current picture block, where the motion vector difference of the current picture block is used to indicate a difference between the motion vector predictor and a motion vector target value of the current picture block.

In some embodiments, the obtaining unit 1201 may include the entropy decoding unit 304, configured to obtain the index value of the length of the motion vector difference of the current picture block, or obtain an index value of a direction of the motion vector difference of the current picture block. The prediction unit 1202 may include the prediction unit 360, and may include the inter prediction unit 344.

The prediction unit 1202 may be further configured to: determine target length information from a set of candidate length information based on the index value of the length, where the set of candidate length information includes candidate length information of only N motion vector differences, and N is a positive integer greater than 1 and less than 8; obtain the motion vector difference of the current picture block based on the target length information; determine the motion vector target value of the current picture block based on the motion vector difference of the current picture block and the motion vector predictor of the current picture block; and obtain a prediction block of the current picture block based on the motion vector target value of the current picture block.

The obtaining unit 1201 may be further configured to obtain the index value of the direction of the motion vector difference of the current picture block. Correspondingly, the prediction unit 1202 may be further configured to determine target direction information from candidate direction information of M motion vector differences based on the index value of the direction, where M is a positive integer greater than 1. After the target direction information is obtained, the prediction unit 1202 may be configured to determine the motion vector difference of the current picture block based on the target direction information and the target length information.

N may be, for example, 4. In some embodiments, the candidate length information of the N motion vector differences may include at least one of the following: When the index value of the length is a first preset value, a length indicated by the target length information is one quarter of a pixel length; when the index value of the length is a second preset value, a length indicated by the target length information is a half of a pixel length; when the index value of the length is a third preset value, a length indicated by the target length information is one pixel length; or when the index value of the length is a fourth preset value, a length indicated by the target length information is two pixel lengths.

The prediction unit 1202 may be configured to: construct a candidate motion information list of the current picture block, where the candidate motion information list may include L motion vectors, and L is 1, 3, 4, or 5; obtain an index value of prediction information of motion information of the current picture block in the candidate motion information list, where the prediction information of motion information of the current picture block includes the motion vector predictor; and obtain the motion vector predictor based on the index value of the motion information of the current picture block in the candidate motion information list and the candidate motion information list.

It can be understood that, functions of units of the inter prediction apparatus 1200 in this embodiment may be implemented according to the method in the foregoing inter prediction method embodiment. For a specific implementation process, refer to related descriptions in the foregoing method embodiment. Details are not described herein again.

Figure 13:
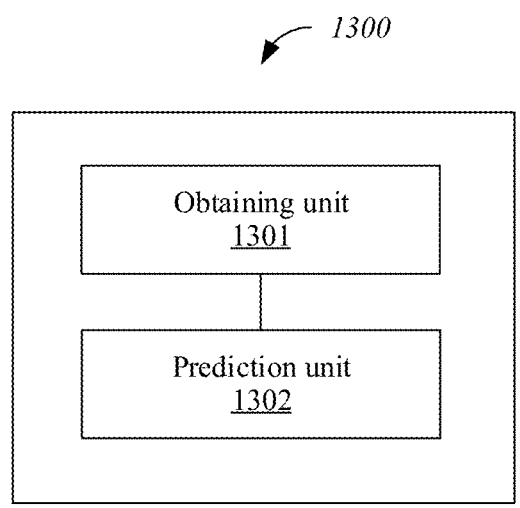
FIG. 13 is a schematic block diagram of an inter prediction apparatus according to an embodiment.

Based on a same inventive concept as the foregoing method, as shown in FIG. 13, an embodiment further provides an inter prediction apparatus 1300. The inter prediction apparatus 1300 may be the source device 12, the video coding system 40, the encoder 20, the video coding device 400, or the coding device 500; or may be a component of the source device 12, the video coding system 40, the encoder 20, the video coding device 400, or the coding device 500. Alternatively, the inter prediction apparatus 1300 may include the prediction processing unit 260 (or for example, the inter prediction unit 244 in the prediction processing unit 260). The inter prediction apparatus 1300 includes an obtaining unit 1301 and a prediction unit 1302. The obtaining unit 1301 and the prediction unit 1302 may be implemented by using software. For example, the obtaining unit 1301 and the prediction unit 1302 may be software modules, or the obtaining unit 1301 and the prediction unit 1302 are a processor and a memory that execute instructions. The obtaining unit 1301 and the prediction unit 1302 may alternatively be implemented by using hardware. For example, the obtaining unit 1301 and the prediction unit 1302 may be modules in a chip.

The obtaining unit 1301 may be configured to obtain a motion vector predictor of a current picture block.

The prediction unit 1302 may be configured to perform motion search in a region of a location indicated by the motion vector predictor of the current picture block, to obtain a motion vector target value of the current picture block.

In some embodiments, the obtaining unit 1301 and the prediction unit 1302 may be used as an implementation of the prediction processing unit 260.

The prediction unit 1302 may be further configured to obtain an index value of a length of a motion vector difference of the current picture block based on the motion vector target value of the current picture block and the motion vector predictor of the current picture block, where the motion vector difference of the current picture block is used to indicate a difference between the motion vector predictor and the motion vector target value of the current picture block, the index value of the length of the motion vector difference of the current picture block is used to indicate one piece of candidate length information in a set of preset candidate length information, the set of candidate length information includes candidate length information of only N motion vector differences, and N is a positive integer greater than 1 and less than 8.

The prediction unit 1302 may be configured to: obtain the motion vector difference of the current picture block based on the motion vector target value of the current picture block and the motion vector predictor of the current picture block; and determine the index value of the length of the motion vector difference of the current picture block and an index value of a direction of the motion vector difference of the current picture block based on the motion vector difference of the current picture block.

N may be, for example, 4.

It can be understood that, functions of units of the inter prediction apparatus 1300 in this embodiment may be implemented according to the method in the foregoing method embodiment. For a specific implementation process, refer to related descriptions in the foregoing method embodiment. Details are not described herein again.

Figure 14:
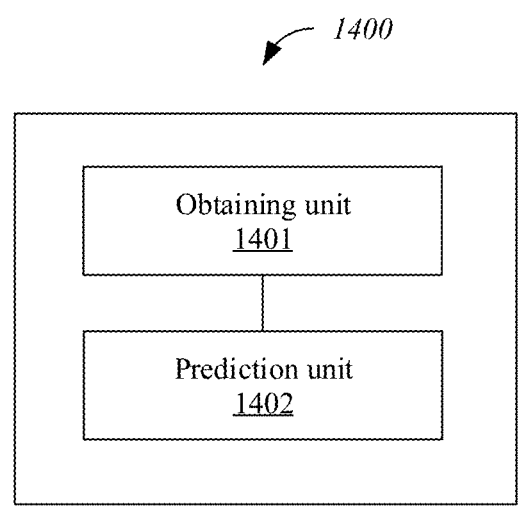
FIG. 14 is a schematic block diagram of an inter prediction apparatus according to an embodiment.

Based on a same inventive concept as the foregoing method, as shown in FIG. 14, an embodiment further provides an inter prediction apparatus 1400. The inter prediction apparatus 1400 may be the destination device 14, the video coding system 40, the decoder 30, the video coding device 400, or the coding device 500; or may be a component of the destination device 14, the video coding system 40, the decoder 30, the video coding device 400, or the coding device 500. Alternatively, the inter prediction apparatus 1400 may include the entropy decoding unit 304 and the prediction processing unit 360 (or for example, the inter prediction unit 344 in the prediction processing unit 360). The inter prediction apparatus 1400 includes an obtaining unit 1401 and a prediction unit 1402. The obtaining unit 1401 and the prediction unit 1402 may be implemented by using software. For example, the obtaining unit 1401 and the prediction unit 1402 may be software modules, or the obtaining unit 1401 and the prediction unit 1402 are a processor and a memory that execute instructions. The obtaining unit 1401 and the prediction unit 1402 may alternatively be implemented by using hardware. For example, the obtaining unit 1401 and the prediction unit 1402 may be modules in a chip.

The prediction unit 1402 may be configured to obtain a motion vector predictor of a current picture block.

The obtaining unit 1401 may be configured to obtain an index value of a direction of a motion vector difference of the current picture block, where the motion vector difference of the current picture block is used to indicate a difference between the motion vector predictor and a motion vector target value of the current picture block.

In some embodiments, the obtaining unit 1401 may include the entropy decoding unit 304, configured to obtain an index value of a length of the motion vector difference of the current picture block, or obtain the index value of the direction of the motion vector difference of the current picture block. The prediction unit 1402 may include the prediction unit 360, and may include the inter prediction unit 344.

The prediction unit 1402 may be further configured to: determine target direction information from a set of candidate direction information based on the index value of the direction, where the set of candidate direction information includes candidate direction information of M motion vector differences, and M is a positive integer greater than 4; obtain the motion vector difference of the current picture block based on the target direction information; determine the motion vector target value of the current picture block based on the motion vector difference of the current picture block and the motion vector predictor of the current picture block; and obtain a prediction block of the current picture block based on the motion vector target value of the current picture block.

The obtaining unit 1401 may be further configured to obtain the index value of the length of the motion vector difference of the current picture block. Correspondingly, the prediction unit 1402 may be further configured to determine target length information from candidate length information of N motion vector differences based on the index value of the length, where N is a positive integer greater than 1. After the target length information is obtained, the prediction unit 1402 may be configured to determine the motion vector difference of the current picture block based on the target direction information and the target length information.

M may be, for example, 8. In some embodiments, the candidate direction information of the M motion vector differences may include at least one of the following: When the index value of the direction is a first preset value, a direction indicated by the target direction information is exactly right; when the index value of the direction is a second preset value, a direction indicated by the target direction information is exactly left; when the index value of the direction is a third preset value, a direction indicated by the target direction information is exactly down; when the index value of the direction is a fourth preset value, a direction indicated by the target direction information is exactly up; when the index value of the direction is a fifth preset value, a direction indicated by the target direction information is lower right; when the index value of the direction is a sixth preset value, a direction indicated by the target direction information is upper right; when the index value of the direction is a seventh preset value, a direction indicated by the target direction information is lower left; or when the index value of the direction is an eighth preset value, a direction indicated by the target direction information is upper left.

The prediction unit 1402 may be configured to: construct a candidate motion information list of the current picture block, where the candidate motion information list may include L motion vectors, and L is 1, 3, 4, or 5; obtain an index value of prediction information of motion information of the current picture block in the candidate motion information list, where the prediction information of motion information of the current picture block includes the motion vector predictor; and obtain the motion vector predictor based on the index value of the motion information of the current picture block in the candidate motion information list and the candidate motion information list.

It can be understood that, functions of units of the inter prediction apparatus 1400 in this embodiment may be implemented according to the method in the foregoing inter prediction method embodiment. For a specific implementation process, refer to related descriptions in the foregoing method embodiment. Details are not described herein again.

Figure 15:
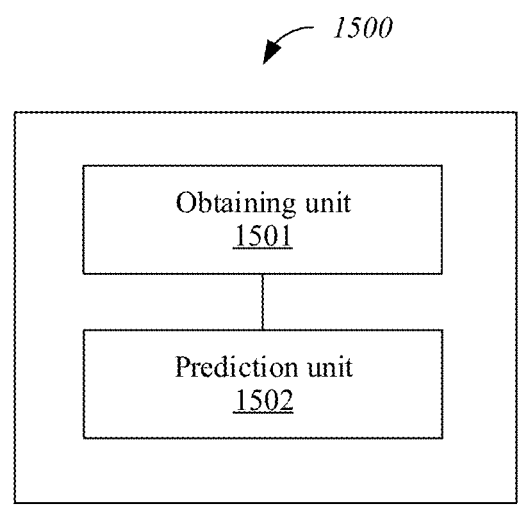
FIG. 15 is a schematic block diagram of an inter prediction apparatus according to an embodiment.

Based on a same inventive concept as the foregoing method, as shown in FIG. 15, an embodiment further provides an inter prediction apparatus 1500. The inter prediction apparatus 1500 may be the source device 12, the video coding system 40, the encoder 20, the video coding device 400, or the coding device 500; or may be a component of the source device 12, the video coding system 40, the encoder 20, the video coding device 400, or the coding device 500. Alternatively, the inter prediction apparatus 1500 may include the prediction processing unit 260 (or for example, the inter prediction unit 244 in the prediction processing unit 260). The inter prediction apparatus 1500 includes an obtaining unit 1501 and a prediction unit 1502. The obtaining unit 1501 and the prediction unit 1502 may be implemented by using software. For example, the obtaining unit 1501 and the prediction unit 1502 may be software modules, or the obtaining unit 1501 and the prediction unit 1502 are a processor and a memory that execute instructions. The obtaining unit 1501 and the prediction unit 1502 may alternatively be implemented by using hardware. For example, the obtaining unit 1501 and the prediction unit 1502 may be modules in a chip.

The obtaining unit 1501 may be configured to obtain a motion vector predictor of a current picture block.

The prediction unit 1502 may be configured to perform motion search in a region of a location indicated by the motion vector predictor of the current picture block, to obtain a motion vector target value of the current picture block.

In some embodiments, the obtaining unit 1501 and the prediction unit 1502 may be used as an implementation of the prediction processing unit 260.

The prediction unit 1502 may be further configured to obtain an index value of a direction of a motion vector difference of the current picture block based on the motion vector target value of the current picture block and the motion vector predictor of the current picture block, where the motion vector difference of the current picture block is used to indicate a difference between the motion vector predictor and the motion vector target value of the current picture block, the index value of the direction of the motion vector difference of the current picture block is used to indicate one piece of candidate direction information in a set of preset candidate direction information, the set of candidate direction information includes candidate length information of M motion vector differences, and M is a positive integer greater than 4.

The prediction unit 1502 may be configured to: obtain the motion vector difference of the current picture block based on the motion vector target value of the current picture block and the motion vector predictor of the current picture block; and determine an index value of a length of the motion vector difference of the current picture block and the index value of the direction of the motion vector difference of the current picture block based on the motion vector difference of the current picture block.

M may be, for example, 8.

It can be understood that, functions of units of the inter prediction apparatus 1500 in this embodiment may be implemented according to the method in the foregoing method embodiment. For a specific implementation process, refer to related descriptions in the foregoing method embodiment. Details are not described herein again.

Figure 16:
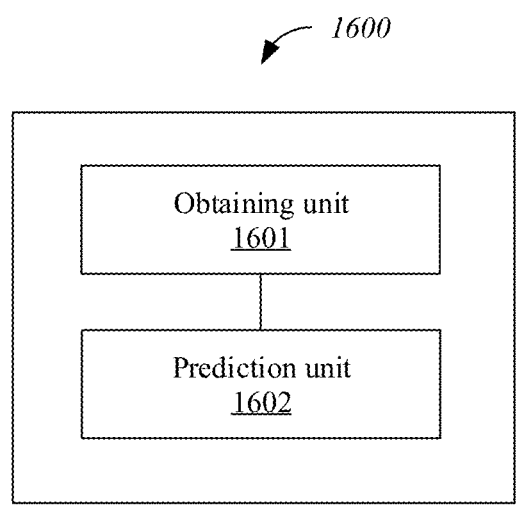
FIG. 16 is a schematic block diagram of an inter prediction apparatus according to an embodiment.

Based on a same inventive concept as the foregoing method, as shown in FIG. 16, an embodiment further provides an inter prediction apparatus 1600. The inter prediction apparatus 1600 may be the destination device 14, the video coding system 40, the decoder 30, the video coding device 400, or the coding device 500; or may be a component of the destination device 14, the video coding system 40, the decoder 30, the video coding device 400, or the coding device 500. Alternatively, the inter prediction apparatus 1600 may include the entropy decoding unit 304 and the prediction processing unit 360 (or for example, the inter prediction unit 344 in the prediction processing unit 360). The inter prediction apparatus 1600 includes an obtaining unit 1601 and a prediction unit 1602. The obtaining unit 1601 and the prediction unit 1602 may be implemented by using software. For example, the obtaining unit 1601 and the prediction unit 1602 may be software modules, or the obtaining unit 1601 and the prediction unit 1602 are a processor and a memory that execute instructions. The obtaining unit 1601 and the prediction unit 1602 may alternatively be implemented by using hardware. For example, the obtaining unit 1601 and the prediction unit 1602 may be modules in a chip.

The obtaining unit 1601 may be configured to obtain a first motion vector predictor of a current picture block and a second motion vector predictor of the current picture block, where the first motion vector predictor corresponds to a first reference frame, and the second motion vector predictor corresponds to a second reference frame.

The obtaining unit 1601 may be further configured to obtain a first motion vector difference of the current picture block, where the first motion vector difference of the current picture block is used to indicate a difference between the first motion vector predictor and a first motion vector target value of the current picture block, and the first motion vector target value and the first motion vector predictor correspond to a same reference frame.

The prediction unit 1602 may be configured to: determine a second motion vector difference of the current picture block based on the first motion vector difference, where the second motion vector difference of the current picture block is used to indicate a difference between the second motion vector predictor and a second motion vector target value of the current picture block, the second motion vector target value and the second motion vector predictor correspond to a same reference frame, and when a direction of the first reference frame relative to a current frame in which the current picture block is located is the same as a direction of the second reference frame relative to the current frame, the second motion vector difference is the first motion vector difference, or when the direction of the first reference frame relative to the current frame in which the current picture block is located is opposite to the direction of the second reference frame relative to the current frame, a plus or minus sign of the second motion vector difference is opposite to a plus or minus sign of the first motion vector difference, and an absolute value of the second motion vector difference is the same as an absolute value of the first motion vector difference; determine the first motion vector target value of the current picture block based on the first motion vector difference and the first motion vector predictor; determine the second motion vector target value of the current picture block based on the second motion vector difference and the second motion vector predictor; and obtain a prediction block of the current picture block based on the first motion vector target value and the second motion vector target value.

In some embodiments, the obtaining unit 1601 and the prediction unit 1602 may be used as an implementation of the prediction processing unit 360.

It can be understood that, functions of units of the inter prediction apparatus 1600 in this embodiment may be implemented according to the method in the foregoing inter prediction method embodiment. For a specific implementation process, refer to related descriptions in the foregoing method embodiment. Details are not described herein again.

A person skilled in the art can understand that, the functions described with reference to various illustrative logical blocks, modules, and algorithm operations disclosed and described in this specification can be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that are accessible by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

Instructions may be executed by one or more processors such as one or more digital signal processors (DSP), general-purpose microprocessors, application-specific integrated circuits (ASIC), field programmable logic arrays (FPGA), or other equivalent integrated circuit or discrete logic circuits. Therefore, the term "processor" used in this specification may be any one of the foregoing structures or any other structure suitable for implementing the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in the embodiments have respective focuses. For a part that is not described in detail in an embodiment, refer to related descriptions in other embodiments.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter prediction method, comprising:
   obtaining a motion vector predictor of a current picture block;
   obtaining an index value of a length of a motion vector difference of the current picture block, wherein the motion vector difference of the current picture block is used to indicate a difference between the motion vector predictor and a motion vector target value of the current picture block;
   determining target length information from a set of candidate length information based on the index value of the length, wherein the set of candidate length information comprises candidate length information of N motion vector differences, wherein N is a positive integer greater than 1 and less than 8;
   obtaining the motion vector difference of the current picture block based on the target length information;
   determining the motion vector target value of the current picture block based on the motion vector difference of the current picture block and the motion vector predictor of the current picture block; and
   obtaining a prediction block of the current picture block based on the motion vector target value of the current picture block.

2. The method according to claim 1, wherein
the method further comprises:
   obtaining an index value of a direction of the motion vector difference of the current picture block; and
   determining target direction information from candidate direction information of M motion vector differences based on the index value of the direction, wherein M is a positive integer greater than 1; and
   obtaining the motion vector difference of the current picture block comprises:
   determining the motion vector difference of the current picture block based on the target direction information and the target length information.

3. The method according to claim 1, wherein N is 4.

4. The method according to claim 3, wherein the candidate length information of the N motion vector differences comprises at least one of the following:
   when the index value of the length is a first preset value, a length indicated by the target length information is one quarter of a pixel length;
   when the index value of the length is a second preset value, the length indicated by the target length information is a half of the pixel length;
   when the index value of the length is a third preset value, the length indicated by the target length information is one pixel length; or
   when the index value of the length is a fourth preset value, the length indicated by the target length information is two pixel lengths.

5. The method according to claim 1, wherein obtaining the motion vector predictor of the current picture block comprises:
   constructing a candidate motion information list of the current picture block, wherein the candidate motion information list comprises L motion vectors, and L is 1, 3, 4, or 5;
   obtaining an index value of prediction information of motion information of the current picture block in the candidate motion information list, wherein the prediction information of motion information of the current picture block comprises the motion vector predictor; and obtaining the motion vector predictor based on the index value of the prediction information of the motion information of the current picture block in the candidate motion information list and the candidate motion information list.

6. An inter prediction method, comprising:
obtaining a motion vector predictor of a current picture block;
performing motion search in a region of a location indicated by the motion vector predictor of the current picture block, to obtain a motion vector target value of the current picture block; and
obtaining an index value of a length of a motion vector difference of the current picture block based on the motion vector target value of the current picture block and the motion vector predictor of the current picture block, wherein the motion vector difference of the current picture block is used to indicate a difference between the motion vector predictor and the motion vector target value of the current picture block, the index value of the length of the motion vector difference of the current picture block is used to indicate a piece of candidate length information in a set of preset candidate length information, the set of candidate length information comprises candidate length information of N motion vector differences, and N is a positive integer greater than 1 and less than 8.

7. The method according to claim 6, wherein obtaining the index value of the length of the motion vector difference of the current picture block comprises:
obtaining the motion vector difference of the current picture block based on the motion vector target value of the current picture block and the motion vector predictor of the current picture block; and
determining the index value of the length of the motion vector difference of the current picture block and an index value of a direction of the motion vector difference of the current picture block based on the motion vector difference of the current picture block.

8. The method according to claim 6, wherein N is 4.

9. An inter prediction method, comprising:
obtaining a first motion vector predictor of a current picture block and a second motion vector predictor of the current picture block, wherein the first motion vector predictor corresponds to a first reference frame, and the second motion vector predictor corresponds to a second reference frame;
obtaining a first motion vector difference of the current picture block, wherein the first motion vector difference of the current picture block is used to indicate a difference between the first motion vector predictor and a first motion vector target value of the current picture block, and the first motion vector target value and the first motion vector predictor correspond to a same reference frame;
determining a second motion vector difference of the current picture block based on the first motion vector difference, wherein the second motion vector difference of the current picture block is used to indicate a difference between the second motion vector predictor and a second motion vector target value of the current picture block, the second motion vector target value and the second motion vector predictor correspond to a same reference frame, and when a direction of the first reference frame relative to a current frame in which the current picture block is located is the same as a direction of the second reference frame relative to the current frame, the second motion vector difference is the first motion vector difference, or when the direction of the first reference frame relative to the current frame in which the current picture block is located is opposite to the direction of the second reference frame relative to the current frame, a plus or minus sign of the second motion vector difference is opposite to a plus or minus sign of the first motion vector difference, and an absolute value of the second motion vector difference is the same as an absolute value of the first motion vector difference;
determining the first motion vector target value of the current picture block based on the first motion vector difference and the first motion vector predictor;
determining the second motion vector target value of the current picture block based on the second motion vector difference and the second motion vector predictor; and
obtaining a prediction block of the current picture block based on the first motion vector target value and the second motion vector target value.

10. An inter prediction apparatus, comprising:
one or more processors; and
a non-transitory computer-readable storage medium in communication with the one or more processors and storing instructions, which when executed by the one or more processors, cause the one or more processors to:
obtain a motion vector predictor of a current picture block;
obtain an index value of a length of a motion vector difference of the current picture block, wherein the motion vector difference of the current picture block is used to indicate a difference between the motion vector predictor and a motion vector target value of the current picture block;
determine target length information from a set of candidate length information based on the index value of the length, wherein the set of candidate length information comprises candidate length information of N motion vector differences, and N is a positive integer greater than 1 and less than 8;
obtain the motion vector difference of the current picture block based on the target length information;
determine the motion vector target value of the current picture block based on the motion vector difference of the current picture block and the motion vector predictor of the current picture block; and
obtain a prediction block of the current picture block based on the motion vector target value of the current picture block.

11. The apparatus according to claim 10, wherein
the instructions, which when executed by the one or more processors, further cause the one or more processors to:
obtain an index value of a direction of the motion vector difference of the current picture block; and
determine target direction information from candidate direction information of M motion vector differences based on the index value of the direction, wherein M is a positive integer greater than 1; and
to obtain the motion vector difference of the current picture block, the instructions, which when executed by the one or more processors, cause the one or more processors to:
determine the motion vector difference of the current picture block based on the target direction information and the target length information.

12. The apparatus according to claim 10, wherein N is 4.

13. The apparatus according to claim 12, wherein the candidate length information of the N motion vector differences comprises at least one of the following:
when the index value of the length is a first preset value, a length indicated by the target length information is one quarter of a pixel length;
when the index value of the length is a second preset value, the length indicated by the target length information is a half of the pixel length;
when the index value of the length is a third preset value, the length indicated by the target length information is one pixel length; or
when the index value of the length is a fourth preset value, the length indicated by the target length information is two pixel lengths.

14. The apparatus according to claim 10, wherein to obtain the motion vector predictor of the current picture block, the instructions, which when executed by the one or more processors, cause the one or more processors to:
construct a candidate motion information list of the current picture block, wherein the candidate motion information list comprises L motion vectors, and L is 1, 3, 4, or 5;
obtain an index value of prediction information of motion information of the current picture block in the candidate motion information list, wherein the prediction information of motion information of the current picture block comprises the motion vector predictor; and
obtain the motion vector predictor based on the index value of prediction information of the motion information of the current picture block in the candidate motion information list and the candidate motion information list.

15. An inter prediction apparatus, comprising:
one or more processors; and
a non-transitory computer-readable storage medium in communication with the one or more processors and storing instructions, which when executed by the one or more processors, cause the one or more processors to:
obtain a motion vector predictor of a current picture block; and
perform motion search in a region of a location indicated by the motion vector predictor of the current picture block, to obtain a motion vector target value of the current picture block, wherein
obtain an index value of a length of a motion vector difference of the current picture block based on the motion vector target value of the current picture block and the motion vector predictor of the current picture block, wherein the motion vector difference of the current picture block is used to indicate a difference between the motion vector predictor and the motion vector target value of the current picture block, the index value of the length of the motion vector difference of the current picture block is used to indicate a piece of candidate length information in a set of preset candidate length information, the set of candidate length information comprises candidate length information of N motion vector differences, and N is a positive integer greater than 1 and less than 8.

16. The apparatus according to claim 15, wherein to obtain the index value of the length of the motion vector difference of the current picture block, the instructions, which when executed by the one or more processors, cause the one or more processor to:
obtain the motion vector difference of the current picture block based on the motion vector target value of the current picture block and the motion vector predictor of the current picture block; and
determine the index value of the length of the motion vector difference of the current picture block and an index value of a direction of the motion vector difference of the current picture block based on the motion vector difference of the current picture block.

17. The apparatus according to claim 15, wherein N is 4.

18. An inter prediction apparatus, comprising:
one or more processors; and
a non-transitory computer-readable storage medium in communication with the one or more processors and storing instructions, which when executed by the one or more processors, cause the one or more processors to:
obtain a first motion vector predictor of a current picture block and a second motion vector predictor of the current picture block, wherein the first motion vector predictor corresponds to a first reference frame, and the second motion vector predictor corresponds to a second reference frame, wherein
obtain a first motion vector difference of the current picture block, wherein the first motion vector difference of the current picture block is used to indicate a difference between the first motion vector predictor and a first motion vector target value of the current picture block, and the first motion vector target value and the first motion vector predictor correspond to a same reference frame; and
determine a second motion vector difference of the current picture block based on the first motion vector difference, wherein the second motion vector difference of the current picture block is used to indicate a difference between the second motion vector predictor and a second motion vector target value of the current picture block, the second motion vector target value and the second motion vector predictor correspond to a same reference frame, and when a direction of the first reference frame relative to a current frame in which the current picture block is located is the same as a direction of the second reference frame relative to the current frame, the second motion vector difference is the first motion vector difference, or when the direction of the first reference frame relative to the current frame in which the current picture block is located is opposite to the direction of the second reference frame relative to the current frame, a plus or minus sign of the second motion vector difference is opposite to a plus or minus sign of the first motion vector difference, and an absolute value of the second motion vector difference is the same as an absolute value of the first motion vector difference; determine the first motion vector target value of the current picture block based on the first motion vector difference and the first motion vector predictor; determine the second motion vector target value of the current picture block based on the second motion vector difference and the second motion vector predictor; and obtain a prediction block of the current picture block based on the first motion vector target value and the second motion vector target value.

* * * * *